United States Patent
Endo

(10) Patent No.: US 10,764,616 B2
(45) Date of Patent: Sep. 1, 2020

(54) IMAGE TRANSMISSION APPARATUS, IMAGE TRANSMISSION METHOD, AND RECORDING MEDIUM

(71) Applicant: OLYMPUS CORPORATION, Hachioji-shi, Tokyo (JP)

(72) Inventor: Takahisa Endo, Tokyo (JP)

(73) Assignee: OLYMPUS CORPORATION, Tokyo (JP)

(*) Notice: Subject to any disclaimer, the term of this patent is extended or adjusted under 35 U.S.C. 154(b) by 22 days.

(21) Appl. No.: 16/038,910

(22) Filed: Jul. 18, 2018

(65) Prior Publication Data
US 2018/0324471 A1 Nov. 8, 2018

Related U.S. Application Data

(63) Continuation of application No. PCT/JP2016/051979, filed on Jan. 25, 2016.

(51) Int. Cl.
*H04N 7/12* (2006.01)
*H04N 21/2368* (2011.01)
(Continued)

(52) U.S. Cl.
CPC ... *H04N 21/2368* (2013.01); *H04N 21/23406* (2013.01); *H04N 21/4334* (2013.01);
(Continued)

(58) Field of Classification Search
CPC ........... H04N 21/8455; H04N 21/6581; H04N 21/6137; H04N 21/6125; H04N 21/4302;
(Continued)

(56) References Cited

U.S. PATENT DOCUMENTS

| 5,991,313 A | 11/1999 | Tanaka et al. |
| 2007/0300272 A1* | 12/2007 | Takanezawa ...... H04N 21/4334 725/105 |

(Continued)

FOREIGN PATENT DOCUMENTS

| JP | 9-322078 A | 12/1997 |
| JP | 2006-203649 A | 8/2006 |

(Continued)

OTHER PUBLICATIONS

International Search Report dated Mar. 15, 2016, issued in counterpart International Application No. PCT/JP2016/051979, w/English translation (3 pages).

*Primary Examiner* — Peet Dhillon
(74) *Attorney, Agent, or Firm* — Westerman, Hattori, Daniels & Adrian, LLP

(57) ABSTRACT

An image transmission apparatus includes an imaging device, wireless communication equipment and at least one processor. The processor determines whether the wireless communication equipment is able to complete transmission of a first frame image within a transmission period corresponding to a first imaging cycle. The processor controls the wireless communication equipment to continue transmission of the first frame image in a transmission period of a second frame image output from the imaging device in a second imaging cycle when the processor determines that the wireless communication equipment is not able to complete transmission of the first frame image.

3 Claims, 18 Drawing Sheets

(51) Int. Cl.
*H04N 21/234* (2011.01)
*H04N 21/433* (2011.01)
*H04N 21/44* (2011.01)
H04N 21/43 (2011.01)
H04N 21/61 (2011.01)
H04N 21/658 (2011.01)
H04N 21/845 (2011.01)

(52) U.S. Cl.
CPC ... *H04N 21/44008* (2013.01); *H04N 21/4302* (2013.01); *H04N 21/6125* (2013.01); *H04N 21/6137* (2013.01); *H04N 21/6581* (2013.01); *H04N 21/8455* (2013.01)

(58) Field of Classification Search
CPC ......... H04N 21/44008; H04N 21/4334; H04N 21/23406; H04N 21/2368; H04N 21/4223; H04N 7/17318
See application file for complete search history.

(56) References Cited

U.S. PATENT DOCUMENTS

| | | | |
|---|---|---|---|
| 2008/0075004 A1 | 3/2008 | Mishima | |
| 2012/0082390 A1* | 4/2012 | Kawasaki | A61B 1/00022 382/232 |
| 2016/0105709 A1* | 4/2016 | Ogasawara | H04N 21/64761 725/37 |

FOREIGN PATENT DOCUMENTS

| | | |
|---|---|---|
| JP | 2007-49681 A | 2/2007 |
| JP | 2008-79150 A | 4/2008 |
| JP | 2010-141625 A | 6/2010 |

* cited by examiner

IMAGE TRANSMISSION APPARATUS, IMAGE TRANSMISSION METHOD, AND RECORDING MEDIUM

The present application is a continuation application based in international patent application PCT/JP 2016/051979, filed on Jan. 25, 2016, the content of which is incorporated herein by reference.

BACKGROUND OF THE INVENTION

Field of the Invention

The present invention relates to an image transmission apparatus, an image transmission method, and a recording medium.

Description of Related Art

In a wireless endoscope system, a delay in display of an image needs to be decreased as much as possible in order to secure operability for an endoscope operator. Accordingly, it is necessary to wirelessly transmit the image of one frame within one frame period. However, when the communication quality of a wireless communication path has deteriorated, the number of retransmissions of a wireless packet increases and thus transmission of the image of one frame may not be completed within one frame period. When transmission of the image of one frame is not completed within one frame period, there is a problem that a delay in image display increases.

A technology for solving this problem is disclosed in Japanese Unexamined Patent Application, First Publication No. 2006-203649. In this technology, it is determined whether transmission of the image of one frame is completed until a predetermined time within a frame period. When image transmission is not completed, transmission of the image of a frame is stopped during wireless transmission and transmission of the image of the next frame is started.

FIG. 22 shows image transmission based on the technology disclosed in Japanese Unexamined Patent Application, First Publication No. 2006-203649. Time progresses to the right in FIG. 22. A synchronization signal Vsync and an imaging device output in an image transmission apparatus are shown. The synchronization signal Vsync indicates a start timing of one frame in the image transmission apparatus. The imaging device output represents an image, that is, a frame image output from an imaging device in each frame period. A frame number is assigned to each frame image in order to identify a frame period in which the frame image is output. Each frame image in a wireless transmission path is shown. A synchronization signal Vsync and a monitor output in an image reception apparatus are shown. The synchronization signal Vsync indicates a start timing of one frame period in the image reception apparatus. The monitor output represents a frame image displayed on a monitor.

A frame image of frame 0 is transmitted from the image transmission apparatus in a transmission period Tf0 of frame 0. The frame image is segmented into a plurality of packets and the plurality of packets are sequentially transmitted. It is determined whether transmission of a frame image is completed at a transmission completion determination timing of each frame. Transmission of the frame image of frame 0 is completed before a transmission completion determination timing t0 of the transmission period Tf0 of frame 0. Accordingly, the frame image of frame 0 is delayed on the monitor.

A frame image of frame 1 is transmitted from the image transmission apparatus in a transmission period Tf1 of frame 1. Transmission of a packet PK1 fails due to deterioration of communication quality. Accordingly, the packet PK1 is retransmitted. In FIG. 22, the retransmitted packet PK1 is hatched. Likewise, other hatched packets are retransmitted packets. There are cases in which retransmission is performed multiple times due to continuous failure in packet transmission. For example, after failure of initial transmission of a packet PK2, retransmission of the packet PK2 is performed three times.

As the frequency of packet retransmission increases, frame image transmission time increases. Transmission of the frame image of frame 1 is not completed at a transmission completion determination timing t1 of the transmission period Tf1 of frame 1. Accordingly, transmission of the frame image of frame 1 is stopped. The frame image of frame 0 is displayed on the monitor instead of the frame image of frame 1 because transmission of the frame image of frame 1 is stopped.

Similarly, transmission of a frame image of frame 2 is not completed at a transmission completion determination timing t2 of a transmission period Tf2 of frame 2. Accordingly, transmission of the frame image of frame 2 is stopped. The frame image of frame 0 is displayed on the monitor instead of the frame image of frame 2 because transmission of the frame image of frame 2 is stopped.

Transmission of a frame image of frame 3 is completed before a transmission completion determination timing t3 of a transmission period Tf3 of frame 3. Accordingly, the frame image of frame 3 is displayed on the monitor.

SUMMARY OF THE INVENTION

According to a first aspect of the present invention, an image transmission apparatus includes an imaging device, wireless communication equipment, and at least one processor. The imaging device performs imaging in imaging cycles and outputs a frame image in each imaging cycle. The wireless communication equipment wirelessly transmits the frame image output from the imaging device in each imaging cycle to an image reception apparatus in a transmission period corresponding to the imaging cycle. The frame image output from the imaging device in a first imaging cycle among the imaging cycles is defined as a first frame image. The frame image output from the imaging device in a second imaging cycle following the first imaging cycle is defined as a second frame image. The frame image output from the imaging device in a third imaging cycle following the second imaging cycle is defined as a third frame image. The frame image output from the imaging device in a fourth imaging cycle following the third imaging cycle is defined as a fourth frame image. Transmission start times of the frame images are synchronized with start times of the imaging cycles. The processor determines whether a current time is a transmission start time of the first frame image in the first imaging cycle. When the processor determines that the current time is the transmission start time, the processor starts transmission of the first frame image. The processor determines whether the wireless communication equipment is able to complete transmission of the first frame image within the transmission period corresponding to the first imaging cycle. When the processor determines that the wireless communication equipment is not able to complete transmission of the first frame image, the processor controls the wireless communication equipment to continue transmission of the first frame image in the transmission period of the second frame image output from the imaging device in the second imaging cycle. The processor determines whether the current time is a transmission start time of the third frame image in the third imaging cycle. When the processor determines that the current time is the transmission start time of the third frame image, the processor starts transmission of the second frame image or the third frame image. The processor determines whether the current time is a transmission start time of the fourth frame image in the fourth imaging cycle. When the processor determines that the current time is the transmission start time of the fourth frame image, the processor starts transmission of the fourth frame image. The image reception apparatus wirelessly receives the frame images and outputs the frame images to a monitor in each display cycle.

According to a second embodiment of the present invention, in the first embodiment, the image transmission apparatus may further include an image compression circuit which performs an image compression process on the frame images output from the imaging device. When the processor determines that the wireless communication equipment is not able to complete transmission of the first frame image within the transmission period corresponding to the first imaging cycle, the processor may further control the image compression circuit not to perform the image compression process for the second frame image.

According to a third embodiment of the present invention, in the first embodiment, when the processor determines that the wireless communication equipment is able to complete transmission of the first frame image within the transmission period corresponding to the second imaging cycle, the processor may control the wireless communication equipment to transmit the second frame image in the transmission period corresponding to the second imaging cycle.

According to a fourth embodiment of the present invention, in the third embodiment, the processor may determine whether the wireless communication equipment is able to complete transmission of the second frame image within the transmission period corresponding to the second imaging cycle. When the processor determines that the wireless communication equipment is not able to complete transmission of the second frame image, the processor may control the wireless communication equipment to continue transmission of the second frame image in the transmission period corresponding to the third imaging cycle.

According to a fifth embodiment of the present invention, an image transmission method includes a first step, a second step, a third step, a fourth step and a fifth step. In the first step, at least one processor wirelessly transmits frame images output from an imaging device to an image reception apparatus through wireless communication equipment. The frame image output from the imaging device in a first imaging cycle among imaging cycles is defined as a first frame image. The frame image output from the imaging device in a second imaging cycle following the first imaging cycle is defined as a second frame image. The frame image output from the imaging device in a third imaging cycle following the second imaging cycle is defined as a third frame image. The frame image output from the imaging device in a fourth imaging cycle following the third imaging cycle is defined as a fourth frame image. Transmission start times of the frame images are synchronized with start times of the imaging cycles. In the second step, the processor determines whether a current time is a transmission start time of the first frame image in the first imaging cycle. When the processor determines that the current time is the transmission start time, the processor starts transmission of the first frame image. In the third step, the processor determines whether the wireless communication equipment is able to complete transmission of the first frame image within a transmission period corresponding to the first imaging cycle. When the processor determines that the wireless communication equipment is not able to complete transmission of the first frame image, the processor controls the wireless communication equipment to continue transmission of the first frame image in a transmission period of the second frame image output from the imaging device in the second imaging cycle. In the fourth step, the processor determines whether the current time is a transmission start time of the third frame image in the third imaging cycle. When the processor determines that the current time is the transmission start time of the third frame image, the processor starts transmission of the second frame image or the third frame image. In the fifth step, the processor determines whether the current time is a transmission start time of the fourth frame image in the fourth imaging cycle. When the processor determines that the current time is the transmission start time of the fourth frame image, the processor starts transmission of the fourth frame image. The image reception apparatus wirelessly receives the frame images and outputs the frame images to a monitor in each display cycle.

According to a sixth embodiment of the present invention, a non-transitory computer-readable recording medium recording a program for causing a computer to execute a first step, a second step, a third step, a fourth step and a fifth step is provided. In the first step, the computer wirelessly transmits frame images output from an imaging device to an image reception apparatus through wireless communication equipment. The frame image output from the imaging device in a first imaging cycle among imaging cycles is defined as a first frame image. The frame image output from the imaging device in a second imaging cycle following the first imaging cycle is defined as a second frame image. The frame image output from the imaging device in a third imaging cycle following the second imaging cycle is defined as a third frame image. The frame image output from the imaging device in a fourth imaging cycle following the third imaging cycle is defined as a fourth frame image. Transmission start times of the frame images are synchronized with start times of the imaging cycles. In the second step, the computer determines whether a current time is a transmission start time of the first frame image in the first imaging cycle. When the computer determines that the current time is the transmission start time, the computer starts transmission of the first frame image. In the third step, the computer determines whether the wireless communication equipment is able to complete transmission of the first frame image within a transmission period corresponding to the first imaging cycle. When the computer determines that the wireless communication equipment is not able to complete transmission of the first frame image, the computer controls the wireless communication equipment to continue transmission of the first frame image in a transmission period of the second frame image output from the imaging device in the second imaging cycle. In the fourth step, the computer determines whether the current time is a transmission start time of the third frame image in the third imaging cycle. When the computer determines that the current time is the transmission start time of the third frame image, the computer starts transmission of the second frame image or the third frame image. In the fifth step, the computer determines whether the current time is a transmission start time of the fourth frame image in the fourth imaging cycle. When the computer determines that the current time is the transmission start time of the fourth frame image, the computer starts transmission of the fourth frame image. The image reception apparatus wirelessly receives the frame images and outputs the frame images to a monitor in each display cycle.

DETAILED DESCRIPTION OF THE INVENTION

Embodiments of the present invention will be described with reference to the drawings.

First Embodiment

Figure 1:
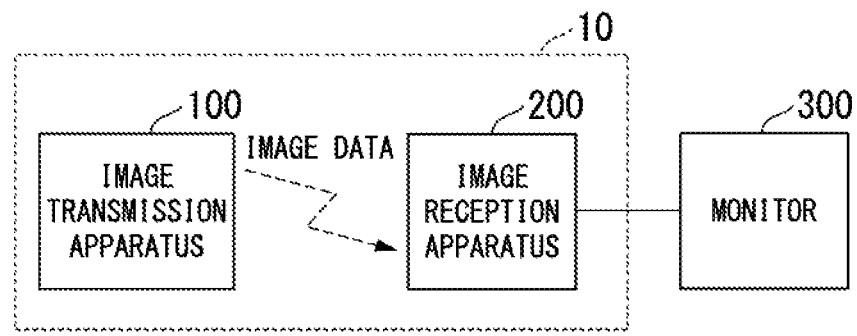
FIG. 1 is a block diagram showing a configuration of an image communication system of a first embodiment of the present invention.

FIG. 1 shows a configuration of an image communication system 10 of a first embodiment of the present invention. As shown in FIG. 1, the image communication system 10 includes an image transmission apparatus 100 and an image reception apparatus 200. The image transmission apparatus 100 and the image reception apparatus 200 perform wireless communication. The image reception apparatus 200 is connected to a monitor 300 (display) through a cable or the like. For example, the image communication system 10 is a wireless endoscope system. For example, the image transmission apparatus 100 is a wireless endoscope. The image communication system 10 is not limited to the wireless endoscope system and may be any system capable of performing wireless image communication.

Figure 2:
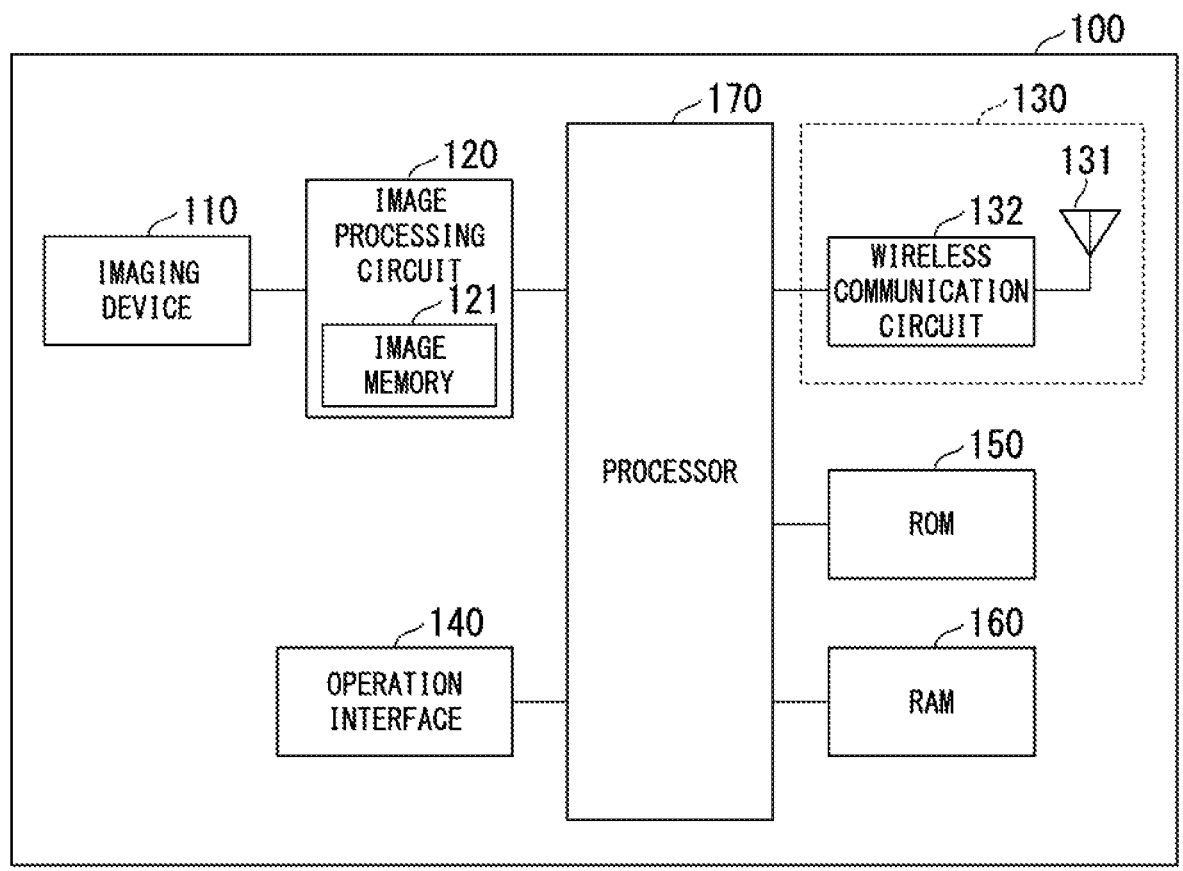
FIG. 2 is a block diagram showing a configuration of an image transmission apparatus of the first embodiment of the present invention.

FIG. 2 shows a configuration of the image transmission apparatus 100. As shown in FIG. 2, the image transmission apparatus 100 includes an imaging device 110, an image processing circuit 120, a wireless communication equipment 130, an operation interface 140, a ROM 150, a RAM 160 and a processor 170. Each component shown in FIG. 2 is hardware.

The imaging device 110 is an image sensor. For example, the imaging device 110 is configured as a CCD or a CMOS sensor. The imaging device 110 converts light forming an image through a lens into an electrical signal, that is, an imaging signal. The analog imaging signal output from the imaging device 110 is converted into a digital signal, that is, image data, by an AD converter (analog-digital converter). That is, the imaging device 110 images a subject in each imaging cycle and generates a frame image. The imaging cycle is one frame period. The frame image corresponds to an imaging signal and image data of one frame.

The image processing circuit 120 performs image processing cm the image data corresponding to the imaging signal output from the imaging device 110. For example, the image processing circuit 120 converts the image data to data suitable for a predetermined video format to generate video data. The image processing circuit 120 may perform an image compression process on the image data.

The image processing circuit 120 includes an image memory 121. The image memory 121 is a buffer. For example, the image memory 121 is configured as a dual-port memory. In the image memory 121, writing of image data and reading of image data may be simultaneously performed.

Figure 3:
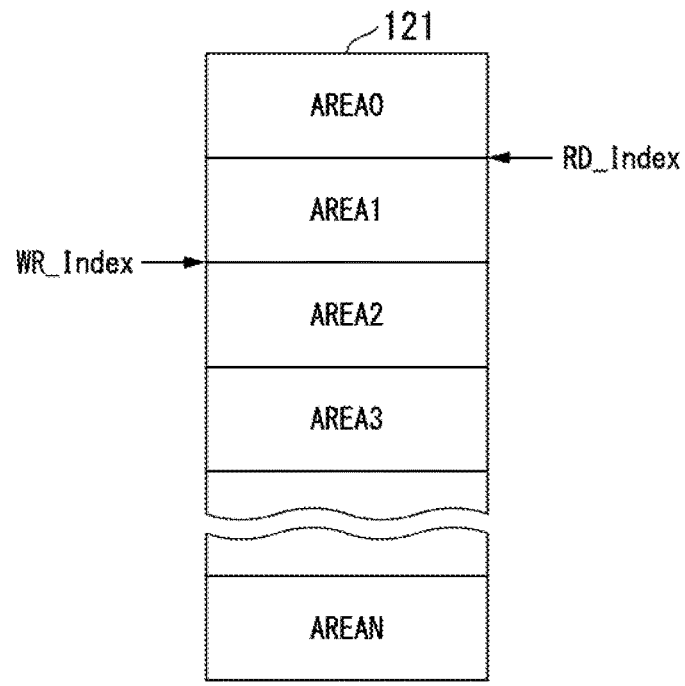
FIG. 3 is a schematic diagram showing a configuration of an image memory of the first embodiment of the present invention.

FIG. 3 shows a configuration of the image memory 121. The image memory 121 has a plurality of areas in which image data of each frame is stored. As shown in FIG. 3, the image memory 121 has area 0 to area N. An area in which image data is written is represented by WR_Index. An area from which image data is read is represented by RD_Index. WR_Index and RD_Index are register values. WR_Index and RD_Index indicate different areas. FIG. 3 shows examples of WR_Index and RD_Index. WR_Index indicates area 2. Accordingly, image data is written in area 2. RD_Index indicates area 1. Accordingly, image data is read from area 1. WR_Index is updated after image data is written. RD_Index is updated after image data is read. WR_Index or RD_Index is updated to a value indicating an area which neighbors the area for which writing or reading of image data has been performed in the downward direction in FIG. 3. When WR_Index or RD_Index indicates area N and writing or reading of image data has been performed for area N, WR_Index or RD_Index is updated to a value indicating area 0.

The wireless communication equipment 130 includes an antenna 131 and a wireless communication circuit 132. The antenna 131 is connected to the wireless communication circuit 132. The wireless communication circuit 132 includes a high frequency circuit unit necessary for wireless communication, a circuit unit for encoding and decoding, and a buffer memory. For example, a wireless LAN protocol (IEEE 802.11) is used as a wireless communication method. The wireless communication circuit 132 performs wireless communication with the image reception apparatus 200 through the antenna 131. The wireless communication circuit 132 transmits image data or necessary information to the image reception apparatus 200 through wireless communication. The wireless communication circuit 132 receives necessary information from the image reception apparatus 200 through wireless communication.

The operation interface 140 includes a plurality of switches such as a power switch and a release switch, and accepts an operation from a user. The operation interface 140 notifies the processor 170 of states of such switches and variations in the states. In addition, the operation interface 140 accepts an image recording indication from the user. The user may operate the release switch of the operation interface 140 to store still image data of the time at which the release switch is operated. A subject can be confirmed on the basis of the stored still image data.

The ROM 150 is a nonvolatile memory such as a flash ROM. Program data and various types of setting information are saved in the ROM 150. The program data is used for control of the image transmission apparatus 100. The setting information includes communication setting parameters. The RAM 160 is a volatile memory. The RAM 160 is used as a buffer, a work area and a temporary area. The buffer is used to temporarily save image data. The work area is used for arithmetic operations and the like performed by the processor 170. The temporary area is used to temporarily save various types of setting information and the like.

The processor 170 is composed of one or more processors. The processor 170 includes a central processing unit (CPU), an application-specific integrated circuit (ASIC) or the like. The processor 170 operates according to a program saved in the ROM 150. Accordingly, the processor 170 controls the operation of the image transmission apparatus 100.

The processor 170 transmits image data or information to the image reception apparatus 200 through the wireless communication equipment 130. Specifically, the processor 170 controls the wireless communication equipment 130 such that the image data or information is transmitted to the image reception apparatus 200. That is, the processor 170 causes the wireless communication equipment 130 to transmit the image data or information to the image reception apparatus 200. Accordingly, the wireless communication equipment 130 transmits the image data or information, to the image reception apparatus 200. The processor 170 receives information from the image reception apparatus 200 through the wireless communication equipment 130. Specifically, the processor 170 controls the wireless communication equipment 130 such that the information is received from the image reception apparatus 200. That is, the processor 170 causes the wireless communication equipment 130 to receive information transmitted from the image reception apparatus 200. Accordingly, the wireless communication equipment 130 receives the information from the image reception apparatus 200.

For example, functions of the processor 170 may be realized as software functions by the processor 170 reading and executing a program including a command for defining the operation of the processor 170. This program may be provided through a "computer-readable recording medium" such as a flash memory, for example. Further, the aforementioned program may be transmitted from a computer having a storage device in which this program is stored to the image transmission apparatus 100 through a transmission medium or by means of transmitted waves in the transmission medium. The "transmission medium" which delivers the program is a medium having a function of delivering information, like a network (communication network) such as the Internet and a communication link (communication line) such as a telephone line. In addition, the aforementioned program may realize some of the above-described functions. Further, the aforementioned program may be a difference file (difference program) which can be realized by combining the above-described functions with a program recorded in a computer.

As described above, the image transmission apparatus 100 includes the imaging device 110, the wireless communication equipment 130 (first wireless communication equipment), and one or more processors 170. The imaging device 110 performs imaging in each imaging cycle and outputs a frame image in each imaging cycle. The wireless communication equipment 130 wirelessly transmits the frame image output from the imaging device 110 in each imaging cycle to the image reception apparatus 200 in a transmission period corresponding to the image cycle. The processor 170 determines whether the wireless communication equipment 130 is able to complete transmission of a first frame image in the transmission period of the first frame image output from the imaging device 110. When the processor 170 determines that the wireless communication equipment 130 is not able to complete transmission of the first frame image, the processor 170 controls the wireless communication equipment 130 to continue transmission of the first frame image in the transmission period of a second frame image which follows the first frame image and is output from the imaging device 110. The image reception apparatus 200 wirelessly receives a frame image and outputs the frame image to the monitor 300 in each display cycle.

A frame image output from the imaging device 110 in a first imaging cycle among imaging cycles is defined as a first frame image. A frame image output from the imaging device 110 in a second imaging cycle following the first imaging cycle among the imaging cycles is defined as a second frame image. A frame image output from the imaging device 110 in a third imaging cycle following the second imaging cycle among the imaging cycles is defined as a third frame image. A frame image output from the imaging device 110 in a fourth imaging cycle following the third imaging cycle among the imaging cycles is defined as a fourth frame image. Transmission start times of the frame images are synchronized with start times of the imaging cycles.

The processor 170 determines whether the current time is a transmission start time of the first frame image in the first imaging cycle. When the processor 170 determines that the current time is the transmission start time, the processor 170 starts transmission of the first frame image. The processor 170 determines whether the wireless communication equipment 130 is able to complete transmission of the first frame image within the transmission period corresponding to the first imaging cycle. When the processor 170 determines that the wireless communication equipment 130 is not able to complete transmission of the first frame image, the processor 170 controls the wireless communication equipment 130 to continue transmission of the first frame image in the transmission period of the second frame image which is output from the imaging device 110 in the second imaging cycle.

The processor 170 determines whether the current time is a transmission start time of the third frame image in the third imaging cycle. When the processor 170 determines that the current time is the transmission start time of the third frame image, the processor 170 starts transmission of the second frame image or the third frame image. The processor 170 determines whether the current time is a transmission start time of the fourth frame image in the fourth imaging cycle. When the processor 170 determines that the current time is the transmission start time of the fourth frame image, the processor 170 starts transmission of the fourth frame image.

When the processor 170 determines that the wireless communication equipment 130 is not able to complete transmission of the first frame image, the processor 170 further performs control such that the second frame image is not transmitted.

Figure 4:
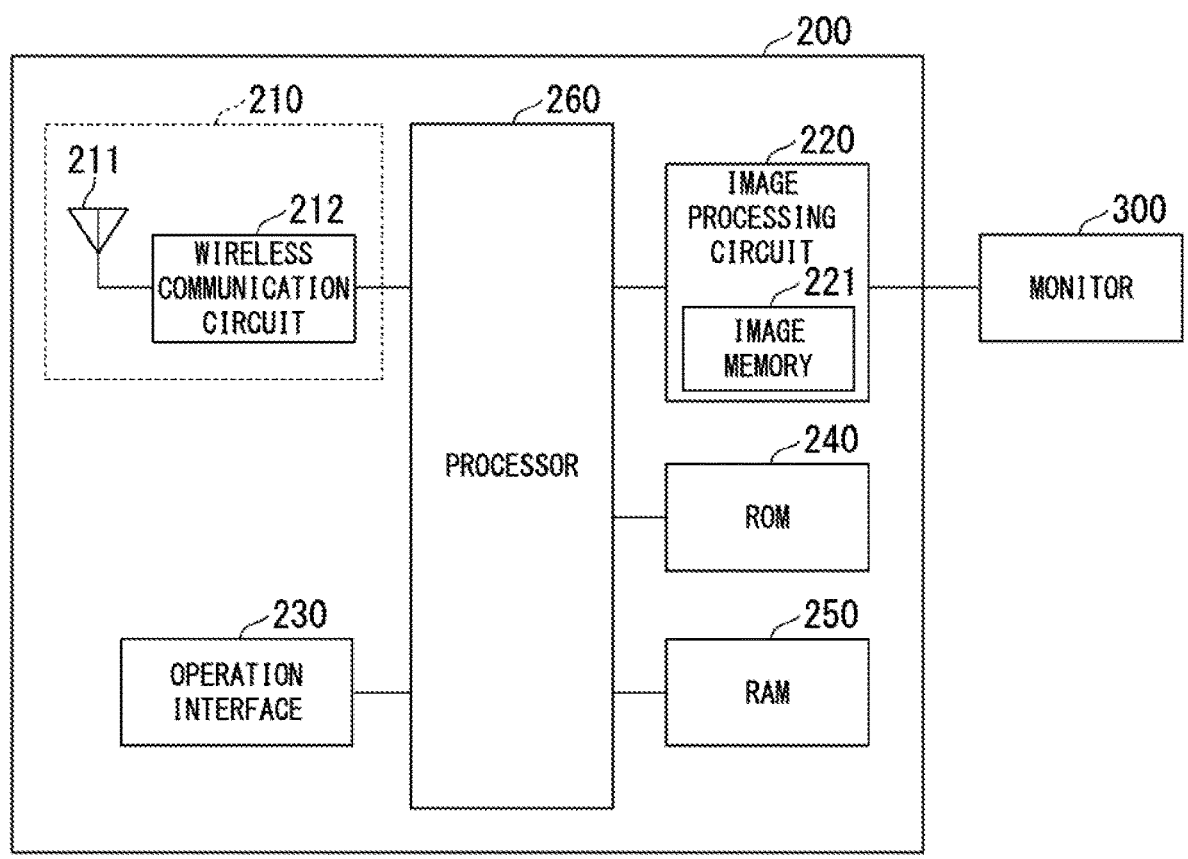
FIG. 4 is a block diagram showing a configuration of an image reception apparatus of the first embodiment of the present invention.

FIG. 4 shows a configuration of the image reception apparatus 200. As shown in FIG. 4, the image reception apparatus 200 includes wireless communication equipment 210, an image processing circuit 220, an operation interface 230, a ROM 240, a RAM 250, and a processor 260. Each component shown in FIG. 4 is hardware.

The wireless communication equipment 210 includes an antenna 211 and a wireless communication circuit 212. The antenna 211 is connected to the wireless communication circuit 212. The wireless communication circuit 212 includes a high frequency circuit unit necessary for wireless communication, a circuit unit for encoding and decoding, and a buffer memory. For example, the wireless LAN protocol (IEEE 802.11) is used as a wireless communication method. The wireless communication circuit 212 performs wireless communication with the image transmission apparatus 100 through the antenna 211. The wireless communication circuit 212 transmits necessary information to the image transmission apparatus 100 through wireless communication. The wireless communication circuit 212 receives image data or necessary information from the image transmission apparatus 100 through wireless communication.

The image processing circuit 220 performs image processing on image data received by the wireless communication equipment 210. For example, the image processing circuit 220 converts the image data to display data in a format used for image display. For example, the image processing circuit 220 converts the image data into an NTSC signal or an HDMI (registered trademark) signal. When the image data has been compressed, the image processing circuit 220 may decompress the image data. The image processing circuit 220 outputs the display data to the monitor 300. The monitor 300 displays an image on the basis of the display data. That is, the image processing circuit 220 outputs a frame image to the monitor 300 in each display cycle and the monitor 300 displays the frame image in each display cycle. The display cycle is a period corresponding to one frame period. The image processing circuit 220 has an image memory 221. The image memory 221 stores image data received by the wireless communication equipment 210. Image data is read from the image memory 221 in each display cycle and the read image data is output to the monitor 300. When loss of image data occurs, the same image data is read from the image memory 221 in a plurality of continuous display cycles.

The operation interface 230 includes a plurality of switches such as a power switch. The operation interface 230 notifies the processor 260 of states of such switches and variations in the states.

The ROM 240 is a nonvolatile memory such as a flash ROM. Program data and various types of setting information are saved in the ROM 240. The program data is used for control of the image reception apparatus 200. The setting information includes communication setting parameters. The RAM 250 is a volatile memory. The RAM 250 is used as a buffer, a work area and a temporary area. The buffer is used to temporarily save received image data. The work area is used for arithmetic operations and the like performed by the processor 260. The temporary area is used to temporarily save various types of setting information and the like.

The processor 260 is composed of one or more processors. The processor 260 includes a CPU, an application-specific integrated circuit (ASIC) or the like. The processor 260 operates according to a program saved in the ROM 240. Accordingly, the processor 260 controls the operation of the image reception apparatus 200.

The processor 260 receives image data or information from the image transmission apparatus 100 through the wireless communication equipment 210. Specifically, the processor 260 controls the wireless communication equipment 210 such that the image data or information is received from the image transmission apparatus 100. That is, the processor 260 causes the wireless communication equipment 210 to receive the image data or information transmitted from the image transmission apparatus 100. Accordingly, the wireless communication equipment 210 receives the image data or information from the image transmission apparatus 100. The processor 260 transmits information to the image transmission apparatus 100 through the wireless communication equipment 210. Specifically, the processor 260 controls the wireless communication equipment 210 such that the information is transmitted to the image transmission apparatus 100. That is, the processor 260 causes the wireless communication equipment 210 to transmit information for the image transmission apparatus 100. Accordingly, the wireless communication equipment 210 transmits the information to the image transmission apparatus 100.

For example, functions of the processor 260 may be realized as software functions by the processor 260 reading and executing a program including a command for defining the operation of the processor 260. An embodiment of the program is the same as the embodiment of the program realizing the functions of the processor 170.

As described above, the image reception apparatus 200 includes the wireless communication equipment 210 (second wireless communication equipment) and the image processing circuit 220 (output circuit). The wireless communication equipment 210 wirelessly receives frame images from the image transmission apparatus 100. The image processing circuit 220 outputs a frame image to the monitor 300 in each display cycle.

Figure 5:
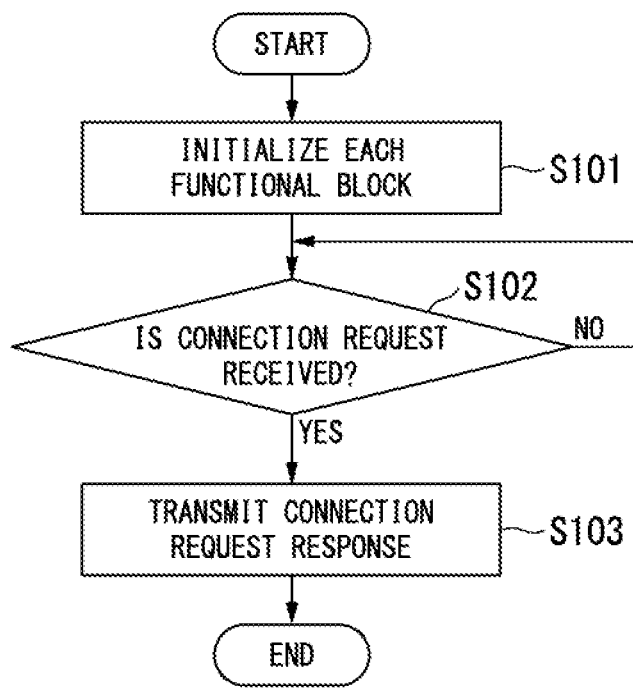
FIG. 5 is a flowchart showing an operation procedure of the image transmission apparatus of the first embodiment of the present invention.

Operations in the first embodiment will be described in detail. The operation of the image transmission apparatus 100 will be described. FIG. 5 to FIG. 10 show operation procedures of the image transmission apparatus 100. FIG. 5 shows an operation procedure of the image transmission apparatus 100 in a connection process.

When power is input to the image transmission apparatus 100, the processor 170 initializes each functional block (step S101). In step S101, the processor 170 initializes setting of a communication channel.

The imaging device 110 starts imaging in step S101. In addition, the image processing circuit 120 starts image processing in step S101.

After each functional block is initialized, the wireless communication equipment 130 wirelessly receives a connection request from the image reception apparatus 200. The connection request is a packet for requesting connection for data communication to a connection counterpart of wireless communication. The processor 170 monitors the wireless communication equipment 130 and determines whether the connection request is received (step S102). When the processor 170 determines that the connection request is not received in step S102, the process in step S102 is continued.

When the processor 170 determines that the connection request is received in step S102, the processor 170 wirelessly transmits a connection request response to the image reception apparatus 200 through the wireless communication equipment 130 (step S103). The connection request response is a response to the connection request. Connection is completed when the image reception apparatus 200 receives the connection request response. The connection process is ended by performing the process in step S103.

Figure 6:
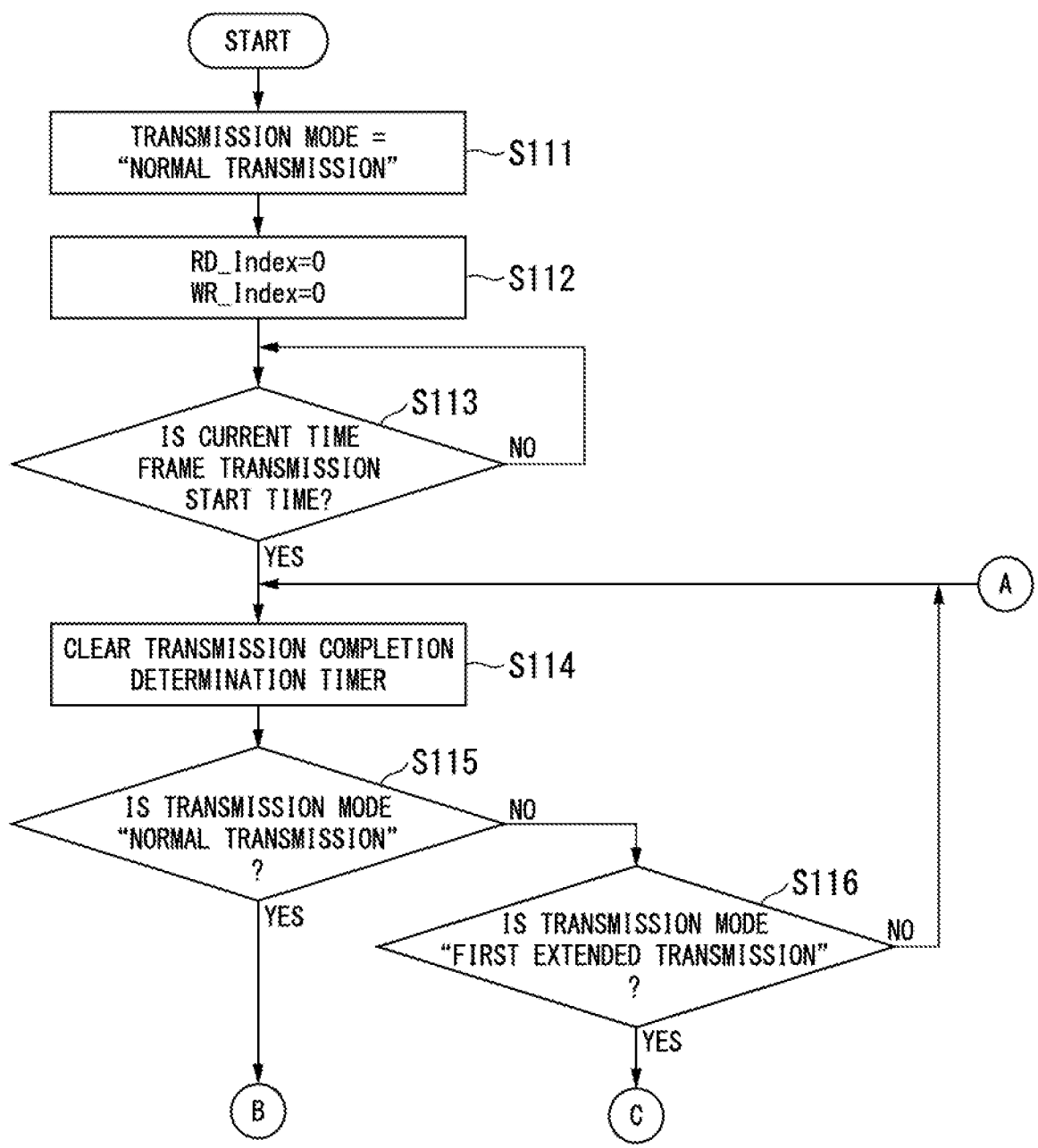
FIG. 6 is a flowchart showing an operation procedure of the image transmission apparatus of the first embodiment of the present invention.
Figure 7:
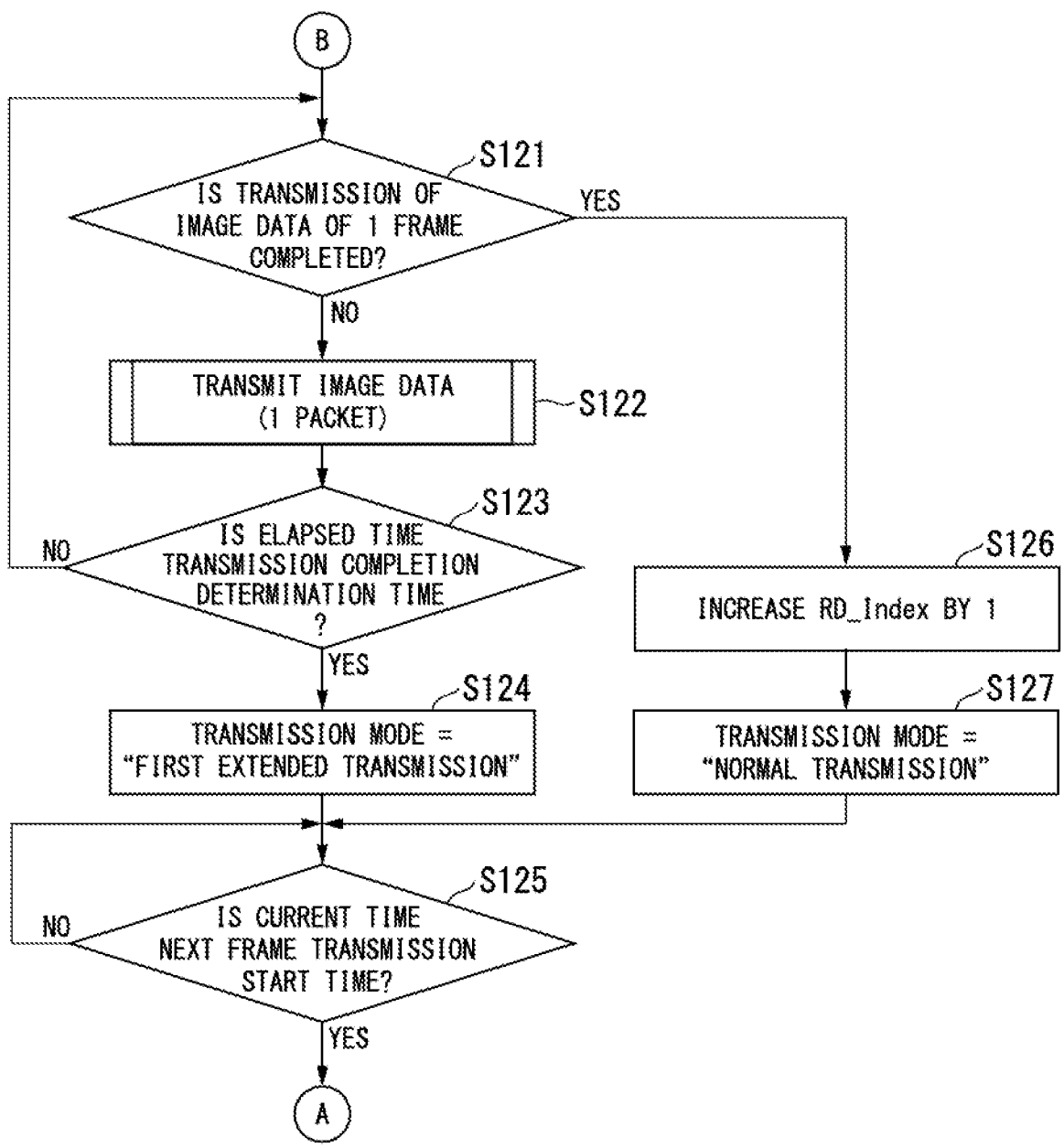
FIG. 7 is a flowchart showing an operation procedure of the image transmission apparatus of the first embodiment of the present invention.
Figure 8:
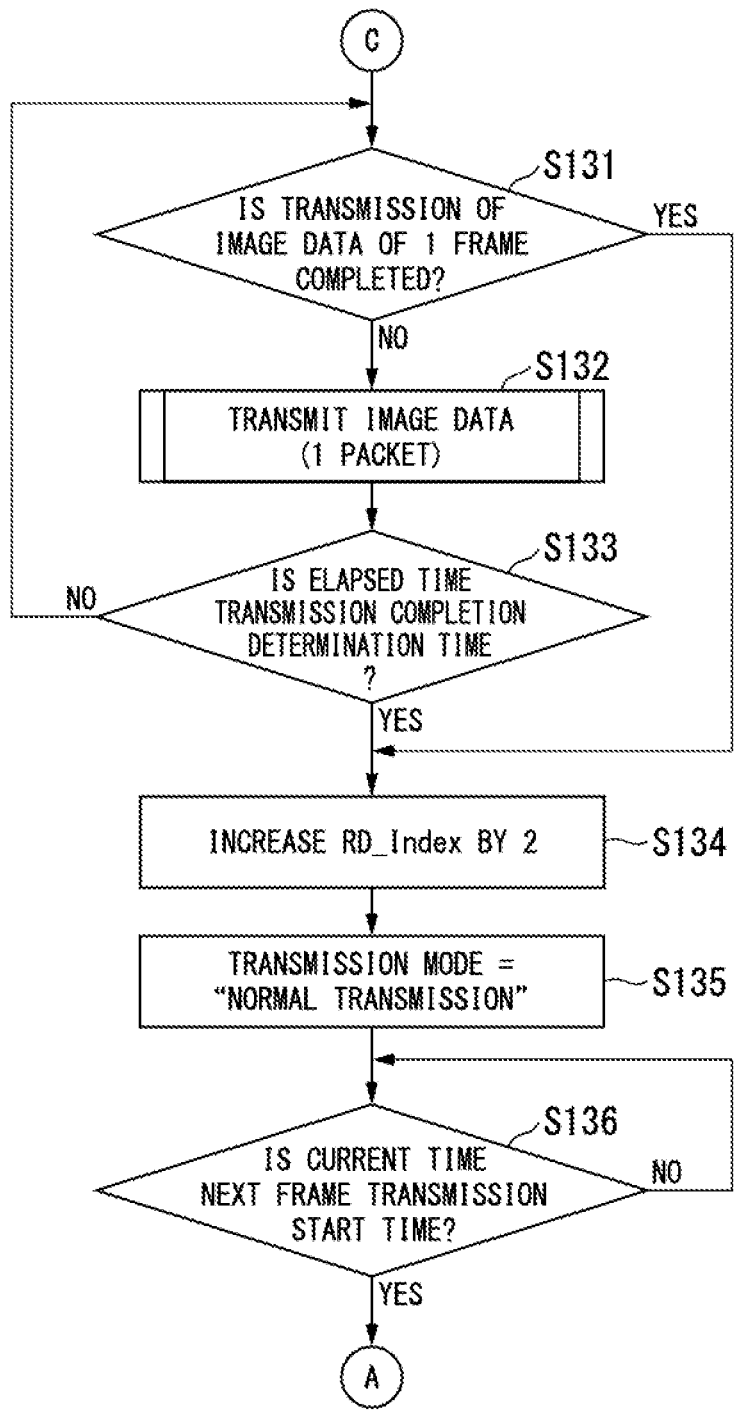
FIG. 8 is a flowchart showing an operation procedure of the image transmission apparatus of the first embodiment of the present invention.

FIG. 6 to FIG. 8 show operation procedures of the image transmission apparatus 100 performed after the connection process shown in FIG. 5.

After connection is completed, the processor 170 sets a transmission mode to "normal transmission" (step S111). The transmission mode is different for each transmission sequence. In a first embodiment, the transmission mode is set to any one of "normal transmission" and "first extended transmission." The transmission mode is held in the RAM 160.

After the transmission mode is set to "normal transmission," the processor 170 sets WR_Index and RD_Index in the image memory 121 to 0 (step S112).

After WR_Index and RD_Index are set, the processor 170 determines whether the current time is a frame transmission start time (step S113). The frame transmission start time is a time at which transmission of image data of one frame, that is, a frame image, corresponding to an imaging signal output from the imaging device 110 is started. The frame transmission start time is a time after the lapse of a predetermined time from a rising edge of the synchronization signal Vsync. When the processor 170 determines that the current time is not the frame transmission start time in step S113, the determination in step S113 is continued.

Figure 9:
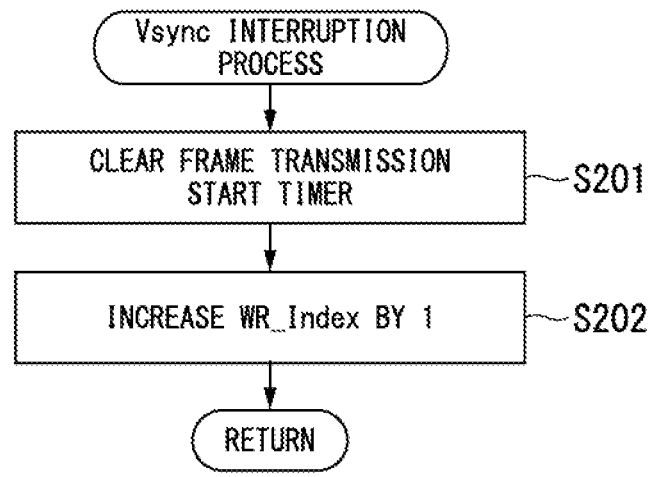
FIG. 9 is a flowchart showing an operation procedure of the image transmission apparatus of the first embodiment of the present invention.

The processor 170 detects the frame transmission start time on the basis of the value of a frame transmission start timer. The frame transmission start tinier is cleared by Vsync interruption. FIG. 9 shows an operation procedure of the image transmission apparatus 100 in a Vsync interruption process performed when Vsync interruption occurs.

Vsync interruption occurs at the timing of the rising edge of the synchronization signal Vsync. When Vsync interruption occurs, the processor 170 clears the frame transmission start timer (step S201). After the frame transmission start timer is cleared, the processor 170 increases WR_Index in the image memory 121 by 1 (step S202). Accordingly, areas in which image data is written are changed. The Vsync interruption process is ended by performing the process in step S202.

When the value of the frame transmission start timer is a predetermined value in step S113, the processor 170 determines that the current time is the frame transmission start time. When the processor 170 determines that the current time is the frame transmission start time in step S113, the processor 170 clears a transmission completion determination timer (step S114). A timing at which the processor 170 determines completion of transmission is based on the value of the transmission completion determination timer.

After the transmission completion determination timer is cleared, the processor 170 determines whether the transmission mode is "normal transmission" (step S115). When the processor 170 determines that the transmission mode is "normal transmission" in step S115, the processor 170 determines whether transmission of the image data of one frame, that is, the frame image, is completed (step S121). When the processor 170 determines that transmission of the frame image is not completed in step S121, the processor 170 performs an image data transmission process (step S122).

Figure 10:
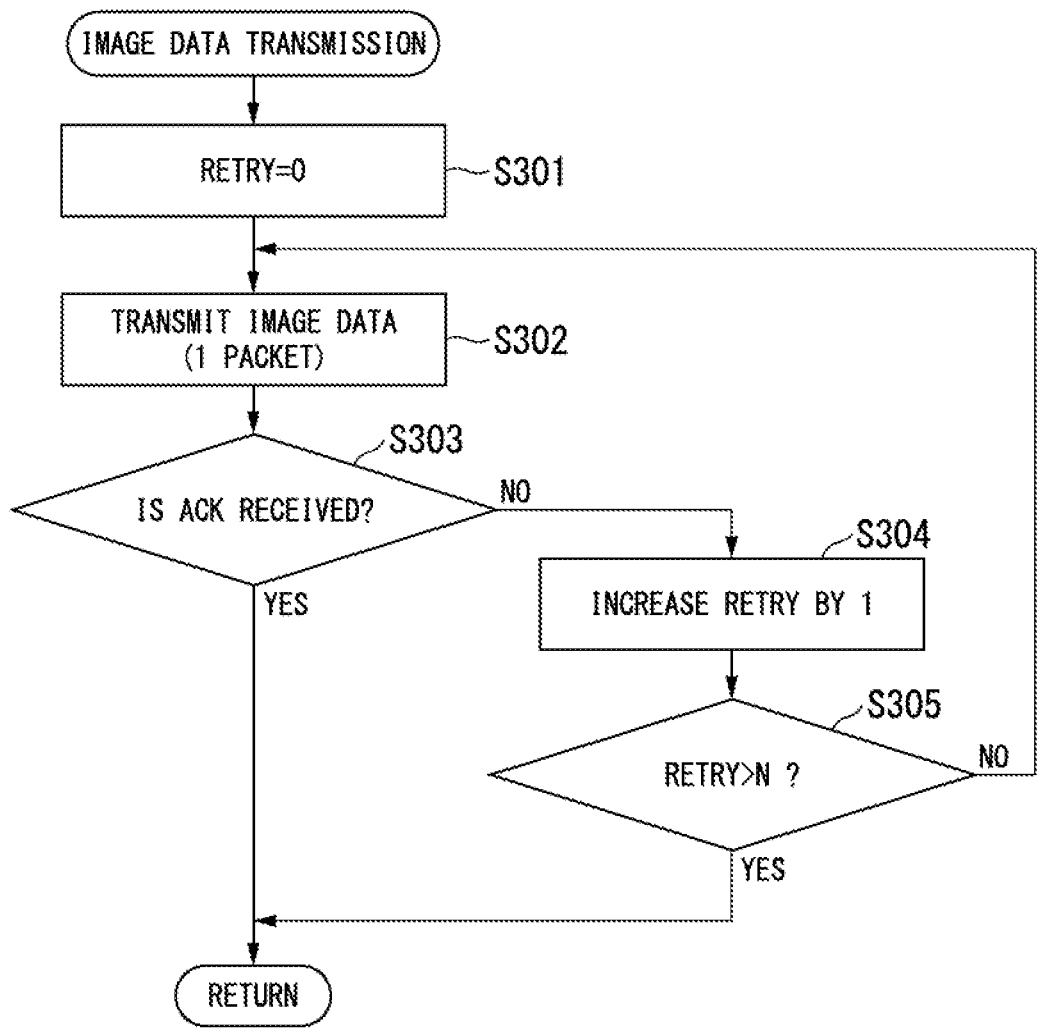
FIG. 10 is a flowchart showing an operation procedure of the image transmission apparatus of the first embodiment of the present invention.

FIG. 10 shows an operation procedure of the image transmission apparatus 100 in the image data transmission process corresponding to step S122. The processor 170 sets RETRY to 0 (step S301). The processor 170 controls retransmission of image data cm the basis of the value of RETRY. RETRY is held in the RAM 160.

After RETRY is set to 0, the processor 170 transmits image data corresponding to one packet to the image reception apparatus 200 through the wireless communication equipment 130 (step S302). The image data transmitted in step S302 is stored in the area indicated by RD_Index in the image memory 121. Image data of one frame is divided into a plurality of pieces of data and a packet including one of the plurality of pieces of data is transmitted in step S302. That is, the wireless communication equipment 130 sequentially transmits a packet including one of a plurality of pieces of data constituting image data of one frame to the image reception apparatus 200.

After the image data corresponding to one packet is transmitted to the image reception apparatus 200, ACK is transmitted from the image reception apparatus 200 which has received the image data. ACK is a packet transmitted from the image reception apparatus 200 when the image data transmitted from the image transmission apparatus 100 has been received normally. The wireless communication equipment 130 wirelessly receives ACK. The processor 170 monitors the wireless communication equipment 130 and determines whether ACK has been received (step S303). When the processor 170 determines that ACK has been received in step S303, the process shown in FIG. 10 is ended.

When the processor 170 determines that ACK has not been received in step S303, the processor 170 increases RETRY by 1 (step S304). After RETRY increases by 1, the processor 170 determines whether RETRY exceeds a predetermined value N (step S305). When the processor 170 determines that RETRY does not exceed the predetermined value N in step S305, the process in step S302 is performed. When the processor 170 determines that RETRY exceeds the predetermined value N in step S305, the process shown in FIG. 10 is ended.

After the process in step S122 is performed, the processor 170 determines whether a time elapsed from the time at which the transmission completion determination timer is cleared in step S114 is a transmission completion determination time (step S123). The processor 170 determines whether the value of the transmission completion determination tinier is greater than or equal to a predetermined value in step S123. The predetermined value corresponds to the transmission completion determination time. The transmission completion determination time is shorter than the transmission period of the image data of one frame, that is, the frame image.

When the processor 170 determines that the value of the transmission completion determination timer is less than the predetermined value, that is, the elapsed time is not the transmission completion determination time in step S123, the process in step S121 is performed. When the value of the transmission completion determination timer is greater than or equal to the predetermined value, that is, the elapsed time is the transmission completion determination time in step S123, the processor 170 determines that the wireless communication equipment 130 is not able to complete transmission of the image data of one frame, that is, the frame image. In this case, the processor 170 sets the transmission mode to "first extended transmission" (step S124).

The first frame image is transmitted through the process of step S122 in the transmission period of the first frame. When transmission of the first frame image is not completed in the transmission period of the first frame, the transmission mode is set to "first extended transmission" through the process of step S124.

When the processor 170 determines that transmission of the frame image is completed in step S121, the processor 170 increases RD_Index in the image memory 121 by 1 (step S126). Accordingly, an area from which the image data is read is changed. After RD_Index increases by 1, the processor 170 sets the transmission mode to "normal transmission" (step S127).

After the process in step S124 or step S127 is performed, the processor 170 determines whether the current time is the next frame transmission start time (step S125). The process in step S125 is the same as the process in step S113. When the processor 170 determines that the current time is not the next frame transmission start time in step S125, the determination in step S125 is continued. When the processor 170 determines that the current time is the next frame transmission start time in step S125, the process in step S114 is performed.

When the processor 170 determines that the transmission mode is not "normal transmission" in step S115, the processor 170 determines whether the transmission mode is "first extended transmission" (step S116). When the processor 170 determines that the transmission mode is not "first extended transmission" in step S116, the process in step S114 is performed.

When the processor 170 determines that the transmission mode is "first extended transmission" in step S116, the processor 170 determines whether transmission of the image data of one frame, that is, the frame image, is completed (step S131). When the processor 170 determines that transmission of the frame image is completed in step S131, the process in step S134 is performed. When the processor 170 determines that transmission of the frame image is not completed in step S131, the processor 170 performs an image data transmission process (step S132). The process in step S132 is the same as the process in step S122.

The area of the image memory 121 from which the image data is read in step S132 is the same as the area of the image memory 121 from which file image data is read in step S122. That is, when transmission of the first frame image is not completed in the transmission period of the first frame, transmission of the first frame image is continued in the transmission period of the second frame following the first frame. In the transmission period of the second frame, a data packet that has not been transmitted in the transmission period of the first frame is transmitted through the process in step S132.

After the process in step S132 is performed, the processor 170 determines whether a time elapsed from the time at which the transmission completion determination tinier is cleared in step S114 is the transmission completion determination time (step S133). The process in step S133 is the same as the process in step S123.

When the processor 170 determines that the value of the transmission completion determination tinier is less than the predetermined value, that is, the elapsed time is not the transmission completion determination time in step S133, the process in step S131 is performed. When the value of the transmission completion determination timer is greater than or equal to the predetermined value, that is, the elapsed time is the transmission completion determination time in step S133, the processor 170 determines that the wireless communication equipment 130 is not able to complete transmission of the image data of one frame, that is, the frame image. In this case, the processor 170 increases RD_Index in the image memory 121 by 2 (step S134). Accordingly, the area from which the image data is read is changed.

When transmission of the first frame image is not completed in the transmission period of the second frame, transmission of the second frame image is not performed through the process in step S134. In a third frame transmission period following the second frame transmission period, transmission of the third franc image is performed through the process in step S122.

After RD_Index increases by 2, the processor 170 sets the transmission mode to "normal transmission" (step S135). After the transmission mode is set to "normal transmission," the processor 170 determines whether the current time is the next frame transmission start time (step S136). The process in step S136 is the same as the process in step S113. When the processor 170 determines that the current time is not the next frame transmission start time in step S136, the determination in step S136 is continued. When the processor 170 determines that the current time is the next frame transmission start time in step S136, the process in step S114 is performed.

In the processes shown in FIG. 6 to FIG. 8, the processor 170 wirelessly transmits a frame image output from the imaging device 110 in each imaging cycle to the image reception apparatus 200 through the wireless communication equipment 130 in a transmission period corresponding to the imaging cycle (steps S122 and S132). The processor 170 determines whether the current time is the transmission start time of the first frame image in the first imaging cycle (step S113). When the processor 170 determines that the current time is the transmission start time, the processor 170 starts transmission of the first frame image using the wireless communication equipment 130 (step S122). The processor 170 determines whether the wireless communication equipment 130 is able to complete transmission of the first frame image within the transmission period corresponding to the first imaging cycle (step S123). When the processor 170 determines that the wireless communication equipment 130 is not able to complete transmission of the first frame image, the processor 170 controls the wireless communication equipment 130 to continue transmission of the first frame image in the transmission period of the second frame image output from the imaging device 110 in the second imaging cycle (step S132). The processor 170 determines whether the current time is the transmission start time of the third frame image in the third imaging cycle (step S133). When the processor 170 determines that the current time is the transmission start time of the third frame image, the processor 170 starts transmission of the second frame image or the third frame image using the wireless communication equipment 130 (step S122). The processor 170 determines whether the current time is the transmission start time of the fourth frame image in the fourth imaging cycle (steps S125 and S136). When the processor 170 determines that the current time is the transmission start time of the fourth frame image, the processor 170 starts transmission of the fourth frame image using the wireless communication equipment 130 (step S122).

When the processor 170 determines that the wireless communication equipment 130 is not able to complete transmission of the first frame image, the processor 170 performs control such that the second frame image is not transmitted (step S134). That is, the processor 170 does not transmit the second frame image to the image reception apparatus 200 through the wireless communication equipment 130. Specifically, the processor 170 controls reading of frame images such that the second frame image is not read from the image memory 121. Accordingly, the processor 170 stops transmission of the second frame image.

Figure 11:
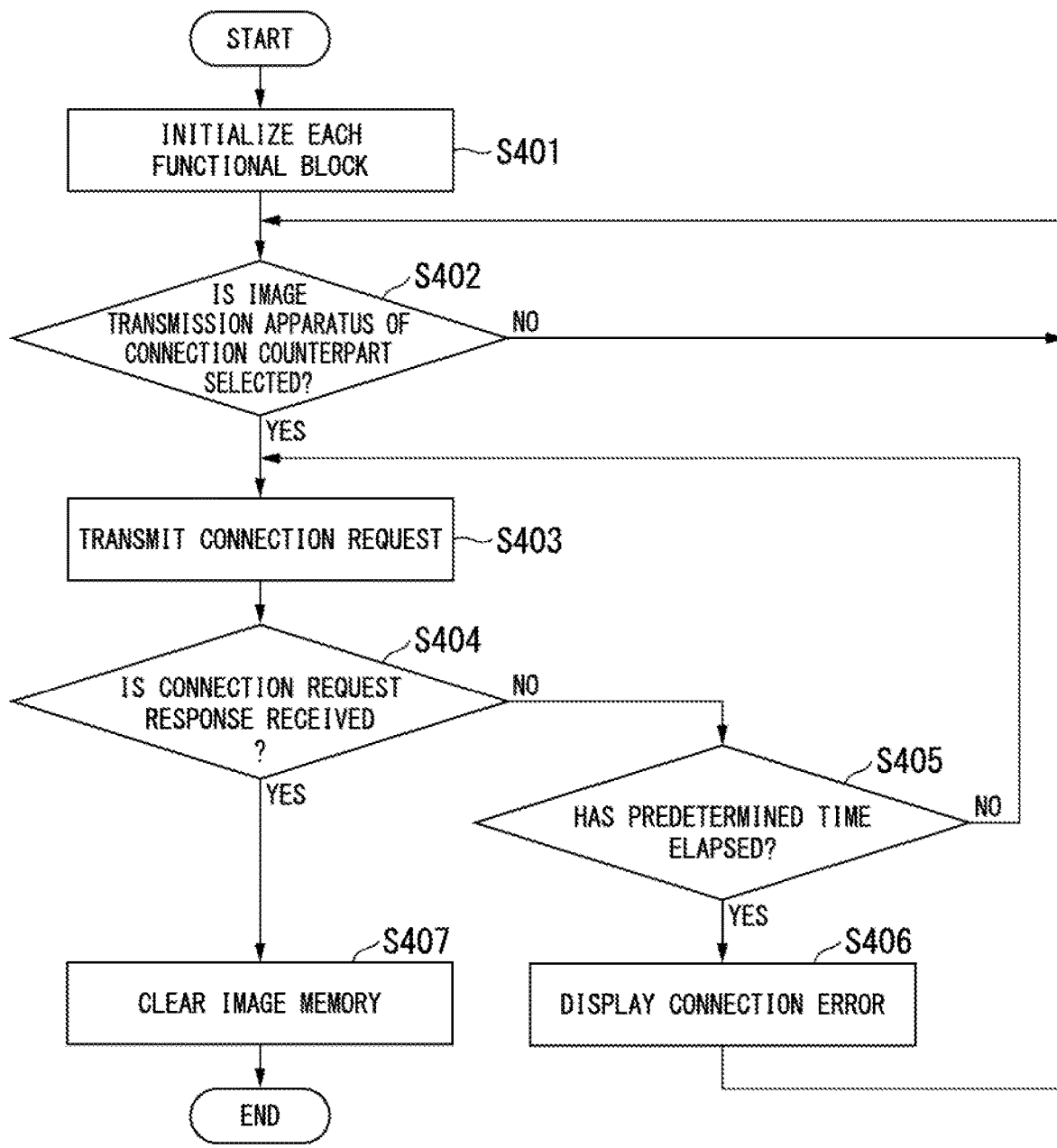
FIG. 11 is a flowchart showing an operation procedure of the image reception apparatus of the first embodiment of the present invention.
Figure 12:
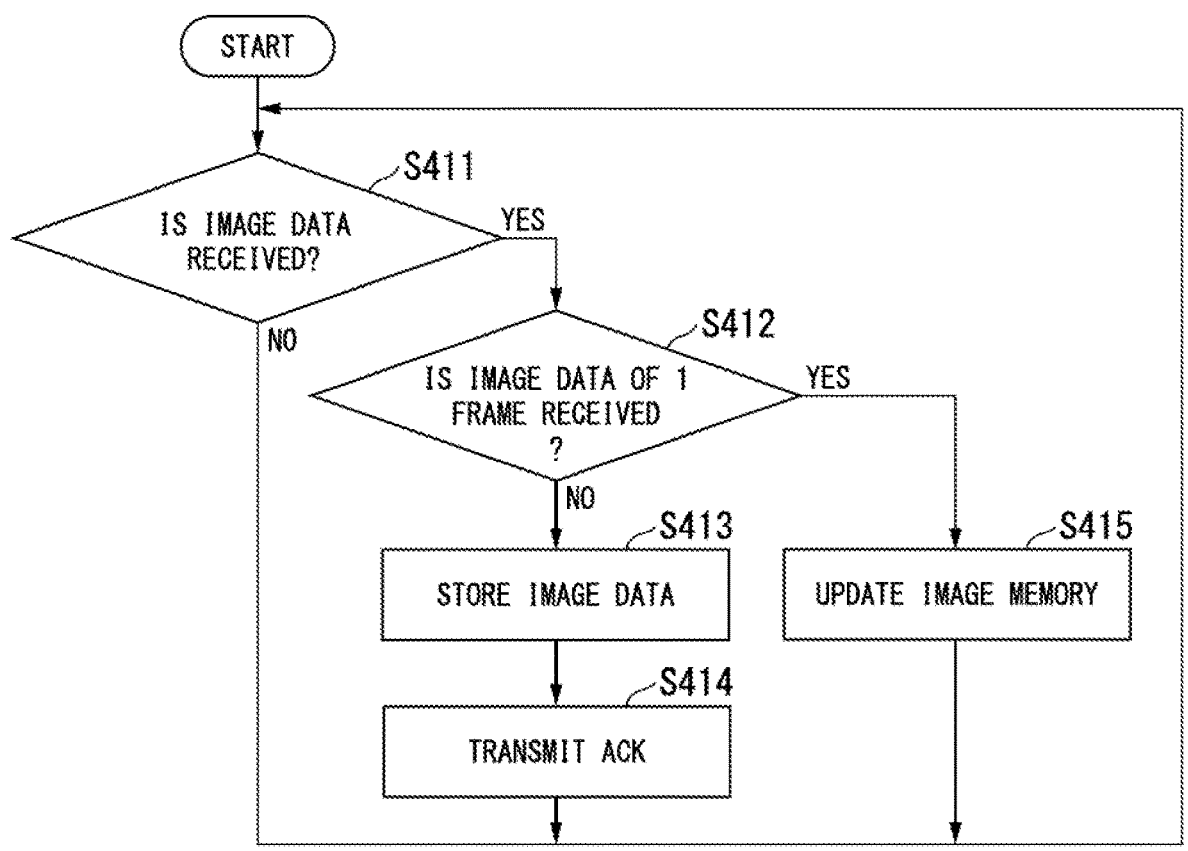
FIG. 12 is a flowchart showing an operation procedure of the image reception apparatus of the first embodiment of the present invention.

The operation of the image reception apparatus 200 will be described. FIG. 11 and FIG. 12 show operation procedures of the image reception apparatus 200. FIG. 11 shows an operation procedure of the image reception apparatus 200 in a connection process.

When power is input to the image reception apparatus 200, the processor 260 initializes each functional block (step S401). The processor 260 initializes setting of a communication channel in step S401.

After each functional block is initialized, the processor 260 detects an operation of a user on the basis of a signal from the operation interface 230 and waits for the user to select the image transmission apparatus 100 that is a connection counterpart (step S402). Information of the image transmission apparatus 100 selectable as the connection counterpart is stored in the ROM 240 in advance.

When the user selects the image transmission apparatus 100 that is the connection counterpart, tire processor 260 identifies the image transmission apparatus 100 selected as the connection counterpart on the basis of a signal from the operation interface 230. The processor 260 generates a connection request. The processor 260 wirelessly transmits the connection request to the image transmission apparatus 100 selected as the connection counterpart through the wireless communication equipment 210 (step S403).

After the connection request is transmitted, a connection request response is transmitted from the image transmission apparatus 100 which has received the connection request. The wireless communication equipment 210 wirelessly receives the connection request response from the image transmission apparatus 100. The processor 260 monitors the wireless communication equipment 210 and determines whether the connection request response is received (step S404).

When the processor 260 determines that the connection request response has not been received in step S404, the processor 260 determines whether a predetermined time has elapsed from the time at which the connection request has been transmitted (step S405). When the processor 260 determines that the predetermined time has not elapsed in step S405, the process in step S403 is performed. When the processor 260 determines that the predetermined time has elapsed in step S405, the processor 260 displays a connection error through the monitor 300 (step S406). After the connection error is displayed, the process in step S402 is performed.

When the processor 260 determines that the connection request response has been received in step S404, the processor 260 clears the image memory 221 (step S407). The connection process is ended by performing the process in step S407.

FIG. 12 shows an operation procedure of the image reception apparatus 200 performed after the connection process shown in FIG. 11.

After connection is completed, the wireless communication equipment 210 wirelessly receives image data from the image transmission apparatus 100. The wireless communication equipment 210 sequentially receives a packet including one of a plurality of pieces of data constituting image data of one frame from the image transmission apparatus 100. The processor 260 monitors the wireless communication equipment 210 and determines whether image data of one packet has been received (step S411). When the processor 260 determines that the image data of one packet has not been received in step S411, the determination in step S411 is continued.

When the processor 260 determines that the image data of one packet has been received in step S411, the processor 260 determines whether image data of one frame, that is, a frame image, has been received (step S412). When the processor 260 determines that the frame image has not been received, that is, reception of the frame image is not completed in step S412, the processor 260 stores received image data in the RAM 250 (step S413).

After the image data is stored in the RAM 250, the processor 260 wirelessly transmits ACK to the image transmission apparatus 100 through the wireless communication equipment 210 (step S414). After ACK is transmitted, the process in step S411 is performed.

When the processor 260 determines that the frame image has been received, that is, reception of the frame image is completed in step S412, the processor 260 stores the image data of one frame, that is, the frame image, stored in the RAM 250, in the image memory 221 (step S415). The processor 260 updates the frame image stored in the image memory 221 to the frame image which has been received in step S415. After the frame image in the image memory 221 is updated, the process in step S411 is performed.

In the process shown in FIG. 12, the wireless communication equipment 210 wirelessly receives frame images from the image transmission apparatus 100 (step S411). The image processing circuit 220 outputs a frame image to the monitor 300 in each display cycle.

Output of frame images to the monitor 300 is performed independently of the process shown in FIG. 12. When transmission of the first frame image is not able to be completed in the transmission period of the first frame image, the image processing circuit 220 outputs a frame image which has been received before the first frame image is received to the monitor 300 in the original display cycle of the first frame image.

Figure 13:
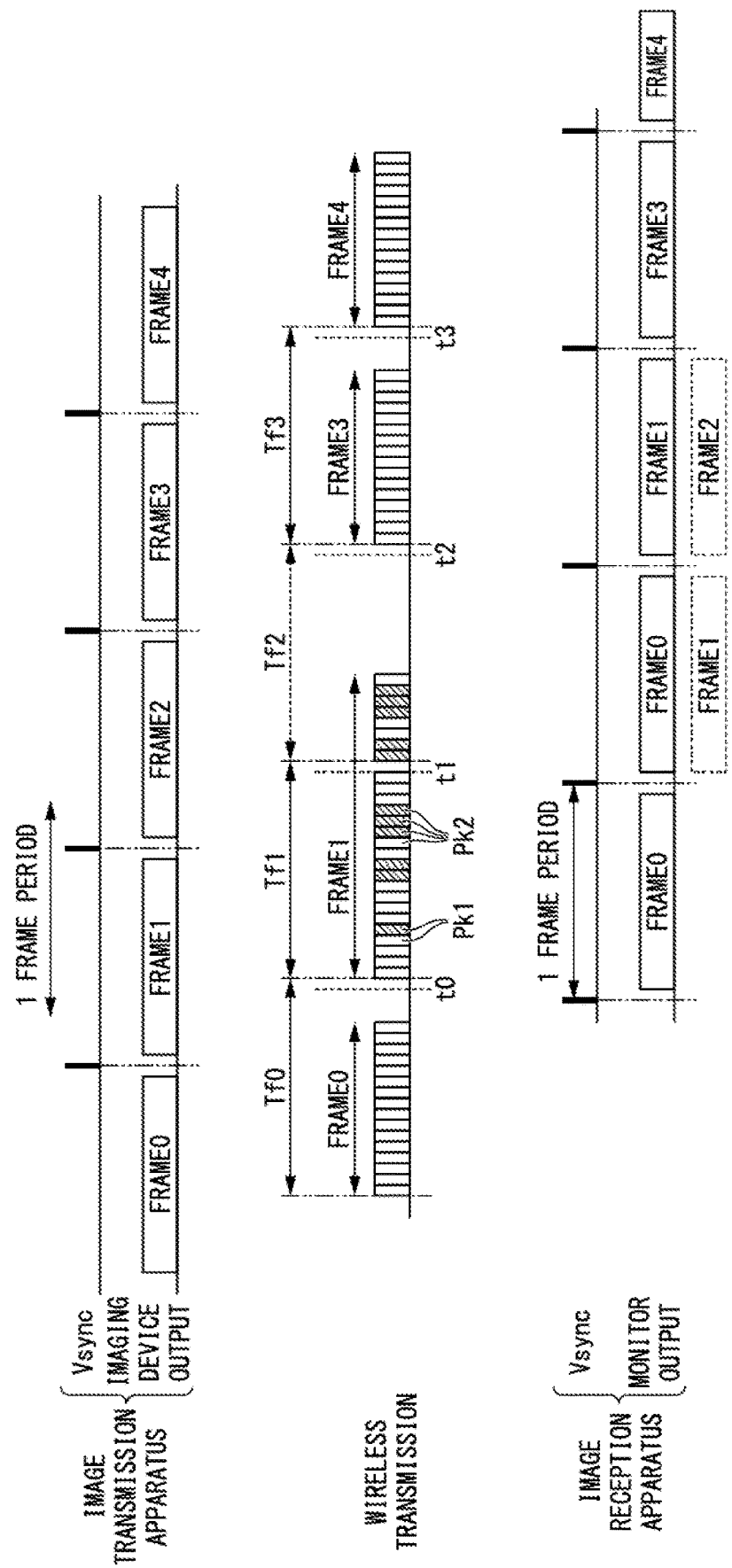
FIG. 13 is a timing chart of image transmission of the first embodiment of the present invention.

FIG. 13 shows image transmission of a first embodiment. Time progresses to the right in FIG. 13. A synchronization signal Vsync and an imaging device output in the image transmission apparatus 100 are shown. The synchronization signal Vsync indicates a start timing of one frame period in the image transmission apparatus 100. The imaging device output indicates an image, that is, a frame image, output from the imaging device 110 in each frame period. A frame number is assigned to each frame image in order to identify a frame period in which the frame image is output. Each frame image in a wireless transmission path is shown. A synchronization signal Vsync and a monitor output in the image reception apparatus 200 are shown. The synchronization signal Vsync indicates a start timing of one frame period in the image reception apparatus 200. The monitor output indicates frame images displayed on the monitor 300.

A frame image of frame 0 is transmitted from the image transmission apparatus 100 in a transmission period Tf0 of frame 0. The frame image is segmented into a plurality of packets and the plurality of packets are sequentially transmitted. It is determined whether transmission of a frame image is completed at a transmission completion determination timing of each frame. Such determination is performed in step S123 and step S133. Transmission of the frame image of frame 0 is completed before a transmission completion determination timing t0 of the transmission period Tf0 of frame 0. Accordingly, the frame image of frame 0 is displayed on the monitor 300.

A frame image of frame 1 is transmitted from the image transmission apparatus 100 in a transmission period Tf1 of frame 1. Transmission of a packet PK1 fails due to communication quality degradation. Accordingly, the packet PK1 is retransmitted. The retransmitted packet PK1 is hatched in FIG. 13. Similarly, other hatched packets are retransmitted packets. There are cases in which retransmission is performed multiple times because packet transmission continuously fails. For example, retransmission of a packet PK2 is performed three times after initial transmission of the packet PK2 fails.

As the frequency of packet retransmission increases, frame image transmission time increases. Transmission of the frame image of frame 1 is not completed at a transmission completion determination timing t1 of the transmission period Tf1 of frame 1. Accordingly, the transmission mode is set to "first extended transmission" through the process in step S124. The frame image of frame 1 is transmitted through the process in step S132 in a transmission period Tf2 of frame 2. At this time, data of the frame image which has not been transmitted in the transmission period Tf1 of frame 1 is transmitted. Transmission of the frame image of frame 1 is not completed at a time when a display cycle of frame 1 is started in the image transmission apparatus 100. Accordingly, the frame image of frame 0 is displayed on the monitor 300 instead of the frame image of frame 1.

Since the frame image of frame 1 is transmitted in the transmission period Tf2 of frame 2, transmission of the frame image of frame 2 is stopped according to the process in step S134. Transmission of the frame image of frame 1 is completed before a transmission completion determination timing t2 of the transmission period Tf2 of frame 2. After the frame image of frame 0 is displayed on the monitor 300, the frame image of frame 1 is displayed on the monitor 300.

A frame image of frame 3 is transmitted from the image transmission apparatus 100 in a transmission period Tf3 of frame 3. Transmission of the frame image of frame 3 is completed before a transmission completion determination timing t3 of the transmission period Tf3 of frame 3. After the frame image of frame 1 is displayed on the monitor 300, the frame image of frame 3 is displayed on the monitor 300.

In image transmission shown in FIG. 13, transmission of the frame image of frame 1 is completed. Accordingly, loss of the frame image of frame 1 among the consecutive frame 1 and frame 2 is avoided.

The image transmission apparatus of each embodiment of the present invention need not have a component corresponding to at least one of the image processing circuit 120, the operation interface 140, the ROM 150 and the RAM 160. The image reception apparatus of each embodiment of the present invention need not have a component corresponding to at least one of the operation interface 230, the ROM 240, the RAM 250 and the processor 260. The image processing function of the image processing circuit 220 is optional.

An image transmission method of each embodiment of the present invention includes a first step (step S122 and step S132), a second step (step S113 and step S122), a third step (step S123 and step S132), a fourth step (step S125 and step S122) and a fifth step (step S125, step S136 and step S122). The image transmission method of each embodiment of the present invention need not include steps other than steps corresponding to the first to fifth steps.

In the first embodiment, when transmission of the first frame image is not able to be completed, the wireless communication equipment 130 is controlled such that transmission of the first frame image is continued in the transmission period of the second frame image which follows the first frame image and is output flora the imaging device 110. Accordingly, continuous frame image loss does not easily occur.

When transmission of the first frame image is not able to be completed, control is performed such that the second frame image is not transmitted. Accordingly, the image transmission apparatus 100 may use the transmission period of the second frame image for transmission of the first frame image. Consequently, it is easy to complete transmission of the first frame image.

Second Embodiment

A second embodiment of the present invention will be described using the image communication system 10 of the first embodiment.

In the image transmission apparatus 100 of the second embodiment, the image processing circuit 120 (image compression circuit) performs an image compression process on frame images output from the imaging device 110. When the processor 170 determines that the wireless communication equipment 130 is not able to complete transmission of the first frame image within the transmission period corresponding to the first imaging cycle, the processor 170 controls the image processing circuit 120 not to perform the image compression process cm the second frame image.

In the image reception apparatus 200 of the second embodiment, the image processing circuit 120 performs an image decompression process on a frame image and outputs the frame image on which the image decompression process has been performed to the monitor 300 in each display cycle.

The operation of the image transmission apparatus 100 of the second embodiment will be described. The operation shown in FIG. 7 is modified to the operation shown in FIG. 14 and the operation shown in FIG. 9 is modified to the operation shown in FIG. 15.

Figure 14:
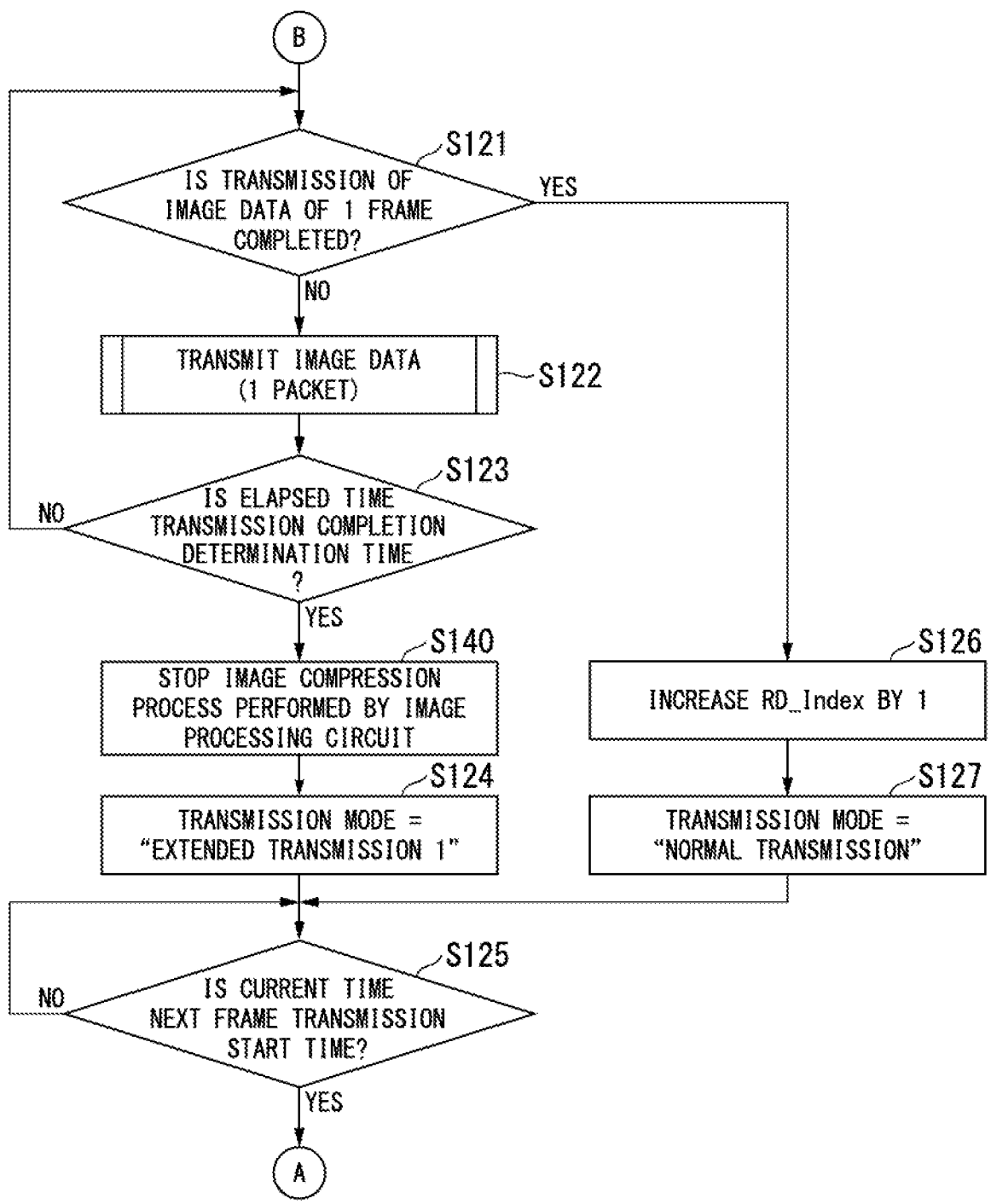
FIG. 14 is a flowchart showing an operation procedure of an image transmission apparatus of a second embodiment of the present invention.

As shown in FIG. 14, when the processor 170 determines that the elapsed time is the transmission completion determination time in step S123, the processor 170 stops the image compression process performed by the image processing circuit 120 (Step S140). After the image compression process performed by the image processing circuit 120 is stopped, the process in step S124 is performed.

When the processor 170 determines that the wireless communication equipment 130 is not able to complete transmission of the first frame image, transmission of the first frame image is continued in the transmission period of the second frame image. Accordingly, transmission of the second frame image is stopped. For this reason, the processor 170 controls the image processing circuit 120 to stop the image compression process for the second frame image.

Figure 15:
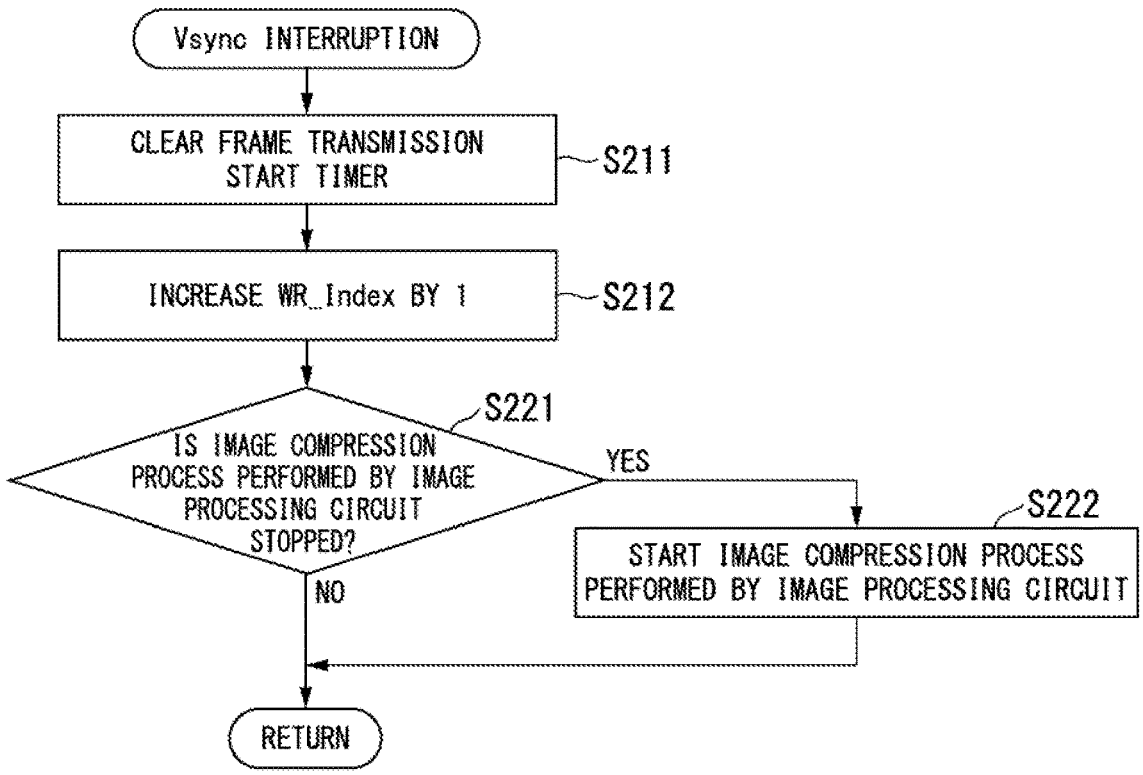
FIG. 15 is a flowchart showing an operation procedure of the image transmission apparatus of the second embodiment of the present invention.

As shown in FIG. 15, after the process in step S212 is performed, the processor 170 determines whether the image compression process performed by the image processing circuit 120 is stopped (step S221). When the processor 170 determines that the image compression process performed by the image processing circuit 120 is not stopped in step S221, the Vsync interruption process is ended. When the processor 170 determines that the image compression process performed by the image processing circuit 120 is stopped in step S221, the processor 170 starts the image compression process performed by the image processing circuit 120 (step S222). The Vsync interruption process is ended by performing the process in step S222.

After the image compression process is started, the image processing circuit 120 performs the image compression process on the frame image and stores the frame image on which the image compression process has been performed in the image memory 121. The wireless communication equipment 130 wirelessly transmits the frame image on which the image compression process has been performed to the image reception apparatus 200.

When the third frame period starts after the image compression process for the second frame image is stopped in the second frame period, the image compression process performed by the image processing circuit 120 is started. Accordingly, the image processing circuit 120 performs the image compression process on the third frame image.

With respect to points other than those described above, the operation of the image transmission apparatus 100 of the second embodiment is the same as the operation of the image transmission apparatus 100 of the first embodiment.

In the second embodiment, when transmission of the first frame image is not able to be completed, the image compression process of the second frame image is stopped. Accordingly, power consumption of the image transmission apparatus 100 is reduced.

Modified Example of Second Embodiment

Figure 16:
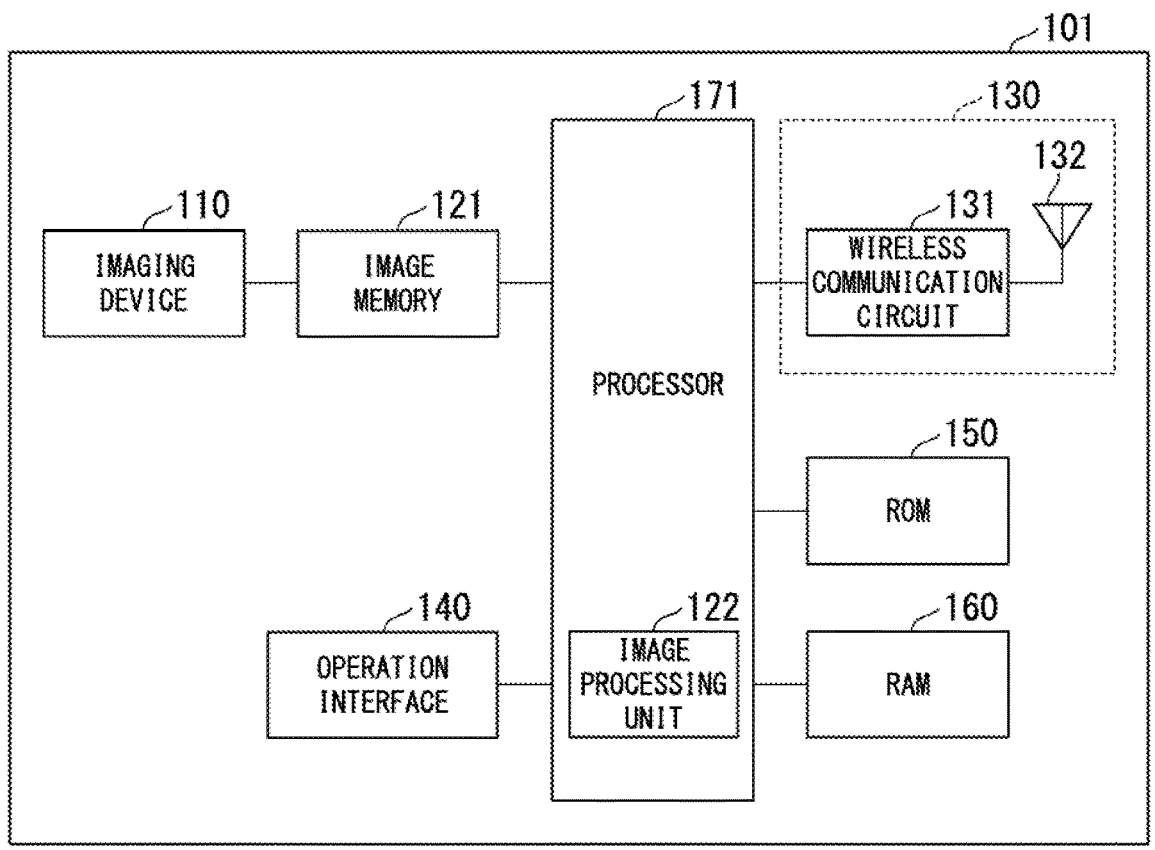
FIG. 16 is a block diagram showing a configuration of an image transmission apparatus of a modified example of the second embodiment of the present invention.

FIG. 16 shows a configuration of an image transmission apparatus 101 of a modified example of the second embodiment. With respect to the configuration shown in FIG. 16, different points from the configuration shown in FIG. 2 will be described.

The image processing circuit 120 in the image transmission apparatus 100 shown in FIG. 2 is changed to the image memory 121. The image memory 121 in the image transmission apparatus 101 is the same as the image memory 121 in the image transmission apparatus 100. The processor 170 in the image transmission apparatus 100 is changed to a processor 171. The processor 171 has the function of an image processing unit 122. The processor 171 performs the image compression process on frame images output from the imaging device 110 through the image processing unit 122 and outputs the frame images on which the image compression process has been performed to the wireless communication equipment 130. The image processing unit 122 may be realized by software.

With respect to points other than those described above, the configuration shown in FIG. 16 is the same as the configuration shown in FIG. 2.

Third Embodiment

A third embodiment of the present invention will be described using the image communication system 10 of the first embodiment.

In the image transmission apparatus 100 of the third embodiment, after transmission of the first frame image is completed in the transmission period of the second frame image, the processor 170 controls the wireless communication equipment 130 to transmit the second frame image. The processor 170 further controls the wireless communication equipment 130 to transmit the second frame image in a transmission period corresponding to an imaging cycle following the imaging cycle in which imaging of the second frame image is performed. When the processor 170 determines that the wireless communication equipment 130 is able to complete transmission of the first frame image within the transmission period corresponding to the second imaging cycle, the processor 170 controls the wireless communication equipment 130 to transmit the second frame image within the transmission period corresponding to the second imaging cycle. The processor 170 determines whether the wireless communication equipment 130 is able to complete transmission of the second frame image within the transmission period corresponding to the second imaging cycle. When the processor 170 determines that the wireless communication equipment 130 is not able to complete transmission of the second frame image, the processor 170 controls the wireless communication equipment 170 to continue transmission of the second frame image in the transmission period corresponding to the third imaging cycle.

Figure 19:
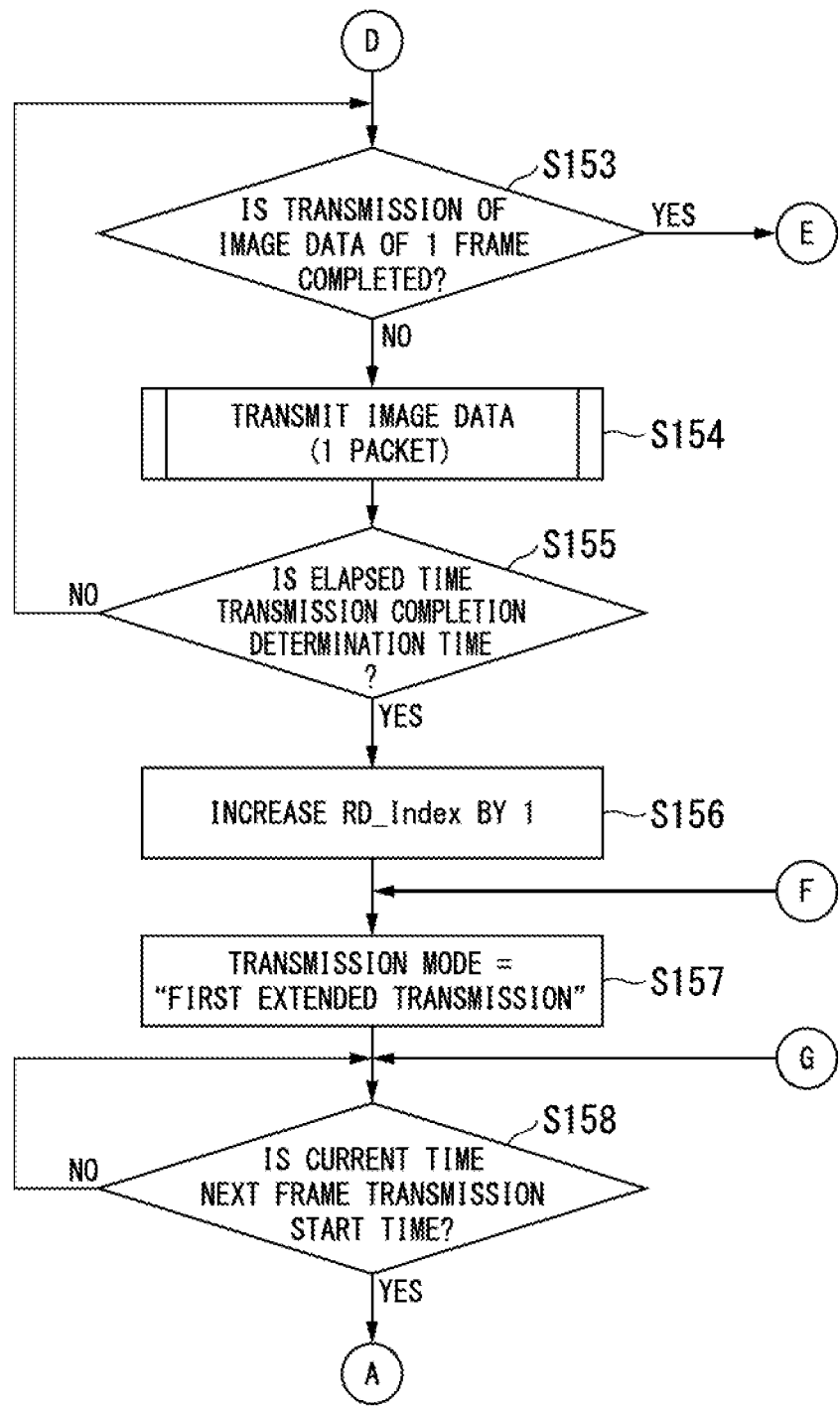
FIG. 19 is a flowchart showing an operation procedure of the image transmission apparatus of the third embodiment of the present invention.
Figure 20:
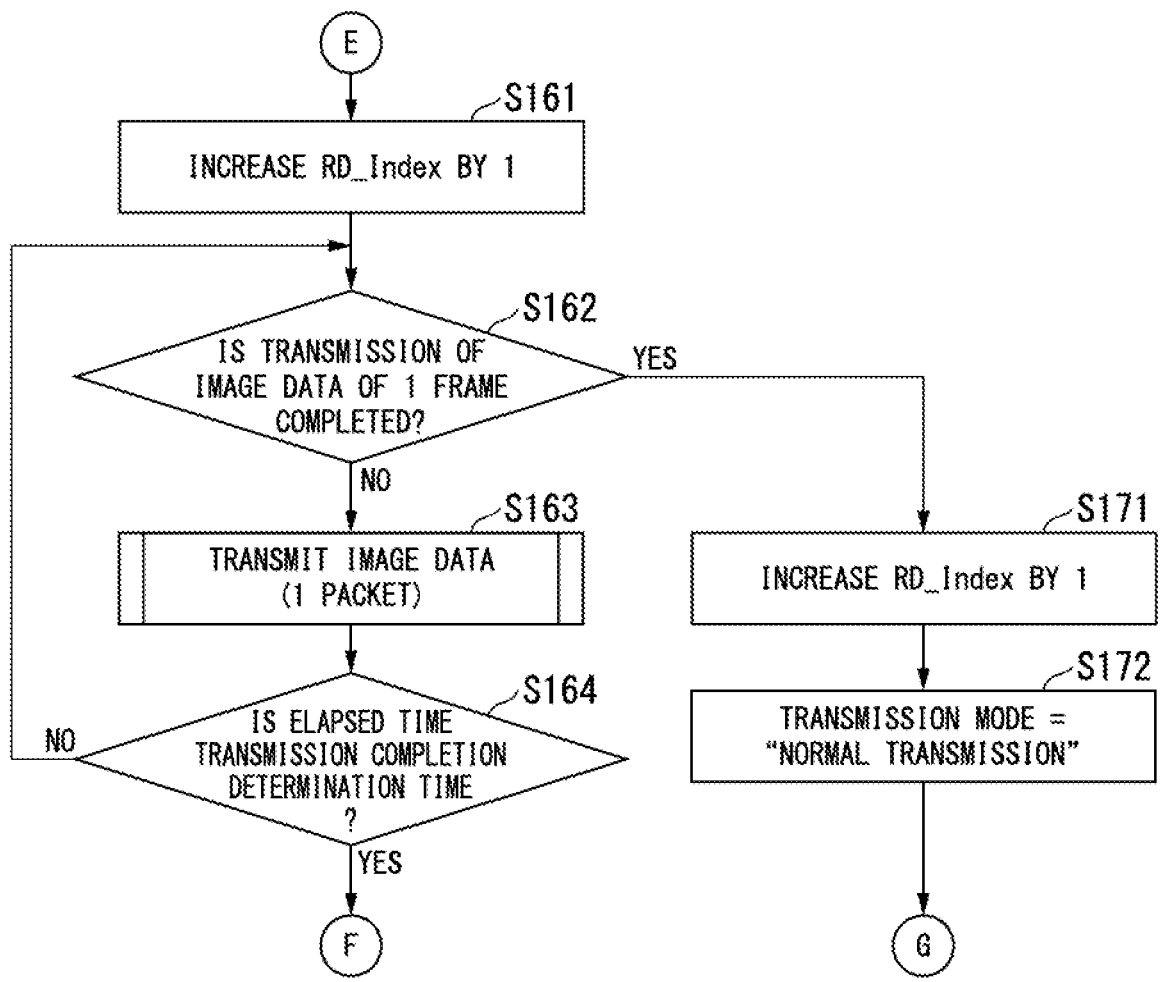
FIG. 20 is a flowchart showing an operation procedure of the image transmission apparatus of the third embodiment of the present invention.

The operation of the image transmission apparatus 100 of the third embodiment will be described. The operation shown in FIG. 6 is changed to operations shown in FIG. 17. FIG. 19 and FIG. 20 and the operation shown in FIG. 7 is changed to an operation shown in FIG. 18.

Figure 18:
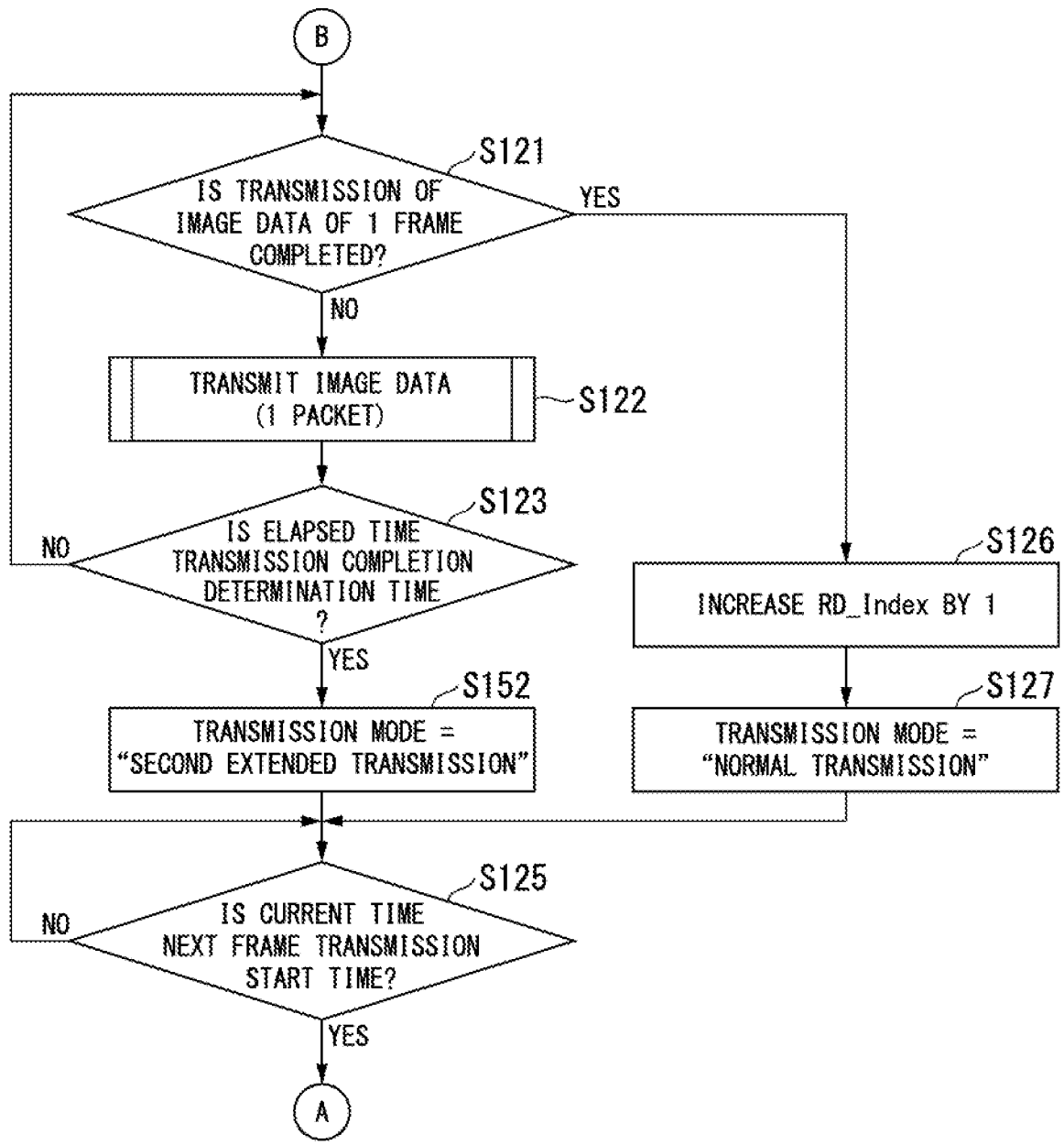
FIG. 18 is a flowchart showing an operation procedure of the image transmission apparatus of the third embodiment of the present invention.

As shown in FIG. 18, when the processor 170 determines that the elapsed time is the transmission completion determination time in step S123, the processor 170 sets the transmission mode to "second extended transmission" (step S152). The transmission mode is set to any one of "normal transmission," "first extended transmission" and "second extended transmission" in the third embodiment. "Second extended transmission" is a transmission mode set between "normal transmission" and "first extended transmission." After the transmission mode is set to "second extended transmission," the process in step S125 is performed.

The first frame image is transmitted through the process in step S122 in the transmission period of the first frame. When transmission of the first frame image is not completed in the transmission period of the first frame, the transmission mode is set to "second extended transmission" through the process in step S152.

Figure 17:
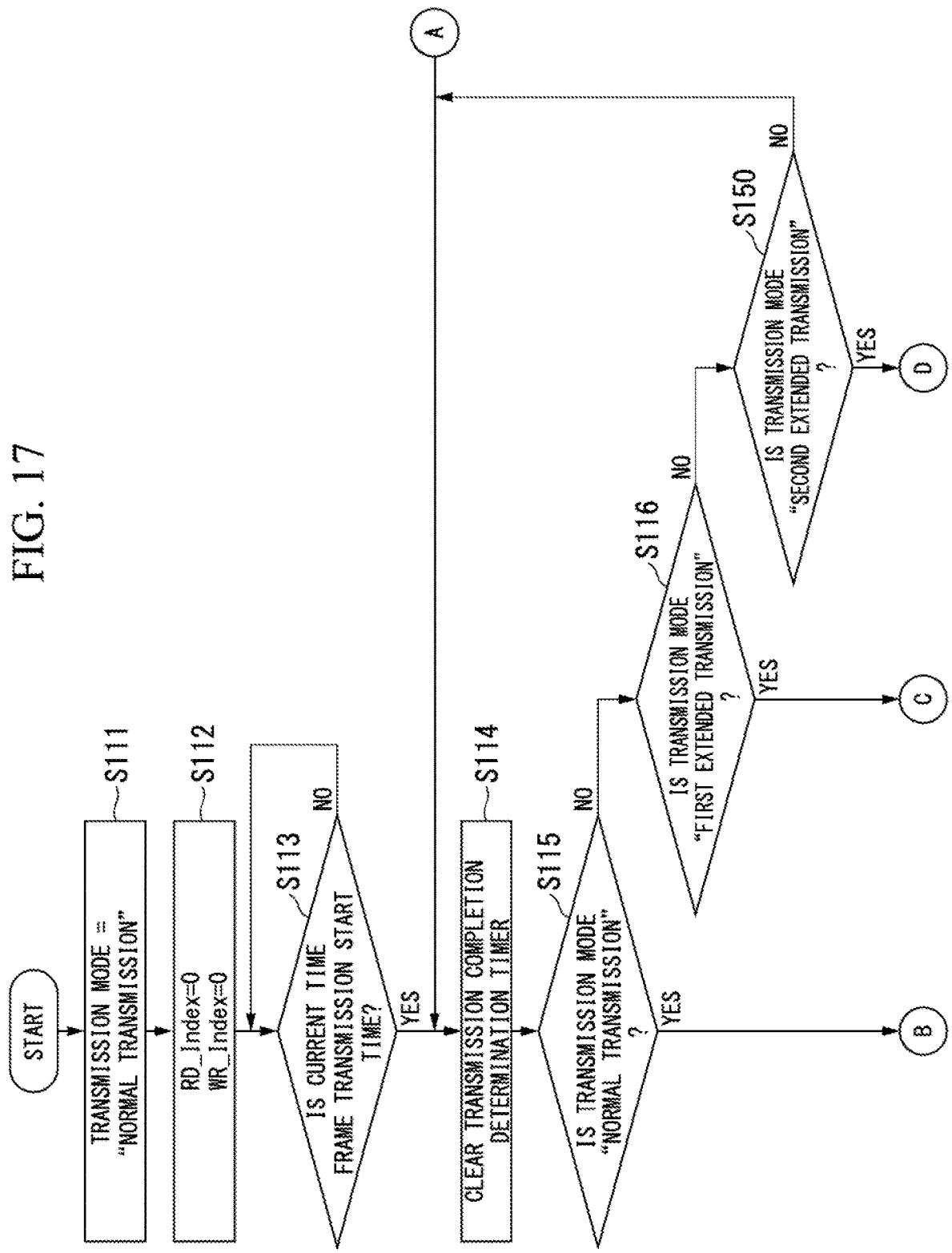
FIG. 17 is a flowchart showing an operation procedure of an image transmission apparatus of a third embodiment of the present invention.

As shown in FIG. 17, when the processor 170 determines that the transmission mode is not "first extended transmission" in step S116, the processor 170 determines whether the transmission mode is "second extended transmission" (step S150). When the processor 170 determines that the transmission mode is not "second extended transmission" in step S150, the process in step S114 is performed.

When the processor 170 determines that the transmission mode is "second extended transmission" in step S150, the processor 170 determines whether transmission of image data of one frame, dial is, a frame image, is completed (step S153) as shown in FIG. 19. When the processor 170 determines that transmission of the frame image is not completed in step S153, the processor 170 performs an image data transmission process (step S154). The process in step S154 is the same as the process in step S122.

An area of the image memory 121 from which the image data is read in step S154 is the same as the area of the image memory 121 from which the image data is read in step S122. That is, when transmission of the first frame image is not completed in the transmission period of the first frame, transmission of the first frame image is continued in the transmission period of the second frame following the first frame. In the transmission period of the second frame, data packets which have not been transmitted in the transmission period of the first frame are transmitted through the process in step 154.

After the process in step S154 is performed, the processor 170 determines whether a time elapsed from the time at which the transmission completion determination timer is cleared in step S114 is a transmission completion determination time (step S155). The process in step S155 is the same as the process in step S123.

When the processor 170 determines that the value of the transmission completion determination timer is less than a predetermined value, that is, the elapsed time is not the transmission completion determination time in step S155, the process in step S153 is performed. When the processor 170 determines that the value of the transmission completion determination timer is greater than or equal to the predetermined value, that is, the elapsed time is the transmission completion determination time in step S155, the processor 170 determines that the wireless communication equipment 130 cannot complete transmission of the frame data of one frame, that is, the frame image. In this case, the processor 170 increases RD_Index in the image memory 121 by 1 (step S156). Accordingly, an area from which the image data is read is changed.

After RD_Index increases by 1, the processor 170 sets the transmission mode to "first extended transmission" (step S157). After the transmission mode is set to "first extended transmission," the processor 170 determines whether the current time is the next frame transmission start time (step S158). The process in step S158 is the same as the process in step S113. When the processor 170 determines that the current time is not the next frame transmission start time in step S158, the determination in step S158 is continued. When the processor 170 determines that the current time is the next frame transmission start time in step S158, the process in step S114 is performed.

When the processor 170 determines that transmission of the frame image is completed in step S153, the processor 170 increases RD_Index in the image memory 121 by 1 (step S161). Accordingly, the area from which the image data is read is changed.

After RD_Index increases by 1, the processor 170 determines whether transmission of the image data of one frame, that is, the frame image, is completed (step S162). When the processor 170 determines that transmission of the frame image is not completed in step S162, the processor 170 performs an image data transmission process (step S163). The process in step S163 is the same as the process in step S122.

After the process in step S163 is performed, the processor 170 determines whether a time elapsed from the time at which the transmission completion determination timer is cleared in step S114 is the transmission completion determination time (step S164). The process in step S164 is the same as the process in step S123.

When the processor 170 determines that the value of the transmission completion determination timer is less than a predetermined value, that is, the elapsed time is not the transmission completion determination time in step S164, the process in step S162 is performed. When the processor 170 determines that the value of the transmission completion determination timer is greater than or equal to the predetermined value, that is, the elapsed time is the transmission completion determination time in step S164, the processor 170 determines that the wireless communication equipment 130 is not able to complete transmission of the frame data of one frame, that is, the frame image. In this case, the processor 170 sets the transmission mode to "first extended transmission" (step S157).

When the processor 170 determines that transmission of the frame image is completed in step S162, the processor 170 increases RD_Index in the image memory 121 by 1 (step S171). Accordingly, the area from which the image data is read is changed. After RD_Index increases by 1, the processor 170 sets the transmission mode to "normal transmission" (step S172). After the transmission mode is set to "normal transmission," the process in step S158 is performed.

The first frame image is transmitted through the process in step S122 in the transmission period of the first frame. When transmission of the first frame image is not completed in the transmission period of the first frame, the transmission mode is set to "second extended transmission" through the process in step S152.

When the transmission mode is "second extended transmission," the first frame image is transmitted through the process in step S154 in the transmission period of the second frame. When the processor 170 determines that the wireless communication equipment 130 completes transmission of the first frame image through the process in step S153 in the transmission period of the second frame, the areas of the image memory 121 from which the image data is read are changed through the process in step S161. After the process in step S161 is performed, RD_Index indicates an area in which the frame image of the second frame has been stored. The second frame image is transmitted through the process in step S163 in the transmission period of the second frame. That is, when transmission of the first frame image is completed in the transmission period of the second frame, transmission of the second frame image is performed in a remaining period of the transmission period of the second frame.

When the processor 170 determines that the wireless communication equipment 130 completes transmission of the second frame image through the process in step S162 in the transmission period of the second frame, the areas of the image memory 121 from which the image data is read are changed through the process in step S171. After the process in step S171 is performed, RD_Index indicates an area in which the frame image of the third frame has been stored. Thereafter, the transmission mode is set to "normal transmission" through the process in step S172. In this case, the third frame image is transmitted through the same process as in the first embodiment in the transmission period of the third frame following the second frame.

When the processor 170 determines that the wireless communication equipment 130 is not able to complete transmission of the second frame image through the process in step S164 in the transmission period of the second frame, the transmission mode is set to "first extended transmission"

through the process in step S157. In this case, transmission of the second frame image is continued through the same process as in the first embodiment in the transmission period of the third frame following the second frame.

When the processor 170 determines that the wireless communication equipment 130 is not able to complete transmission of the first frame image through the process in step S155 in the transmission period of the second frame, the area of the image memory 121 from which the image data is read is changed through the process in step S156. After the process in step S156 is performed, RD_Index indicates an area in which the frame image of the second frame has been stored. Thereafter, the transmission mode is set to "first extended transmission" through the process in step S157. In this case, the second frame image is transmitted through the same process as in the first embodiment in the transmission period of the third frame following the second frame.

In the processes shown in FIG. 17 to FIG. 20, the processor 170 controls the wireless communication equipment 130 to transmit the second frame image in the transmission period of the second frame image after transmission of the first frame image is completed in the transmission period of the second frame image (step S163). Further, the processor 170 controls the wireless communication equipment 130 to transmit the second frame image in a transmission period corresponding to the image cycle following the imaging cycle in which imaging of the second frame image is performed (step S132).

When transmission of the first frame image is not able to be completed in the transmission period of the first frame image, the second frame image may be transmitted in the transmission period of the second frame image and the transmission period following the transmission period of the second frame image irrespective of whether transmission of the second frame image is completed in the transmission period of the second frame image.

With respect to points other than those described above, the operation of the image transmission apparatus 100 of the third embodiment is the same as the operation of the image transmission apparatus 100 of the first embodiment.

Figure 21:
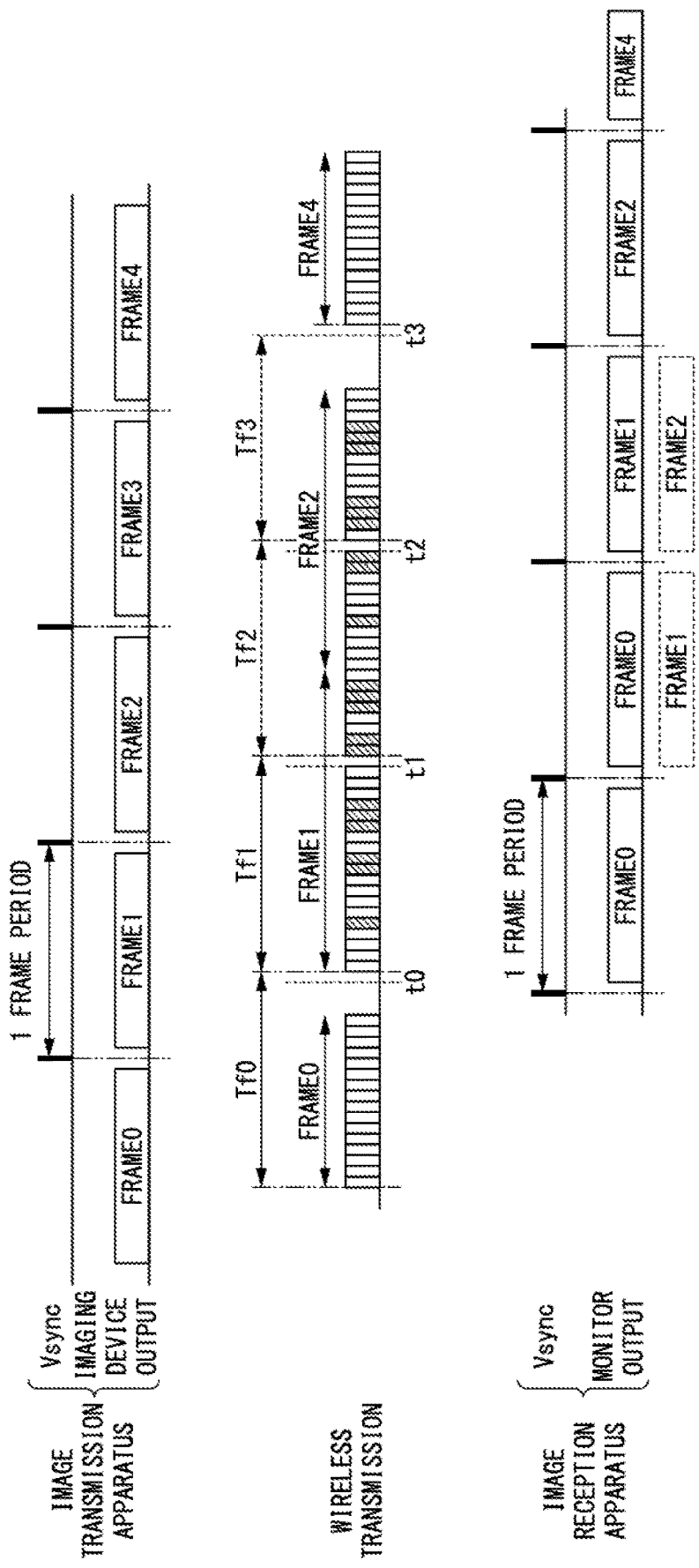
FIG. 21 is a timing chart of image transmission of the third embodiment of the present invention.
Figure 22:
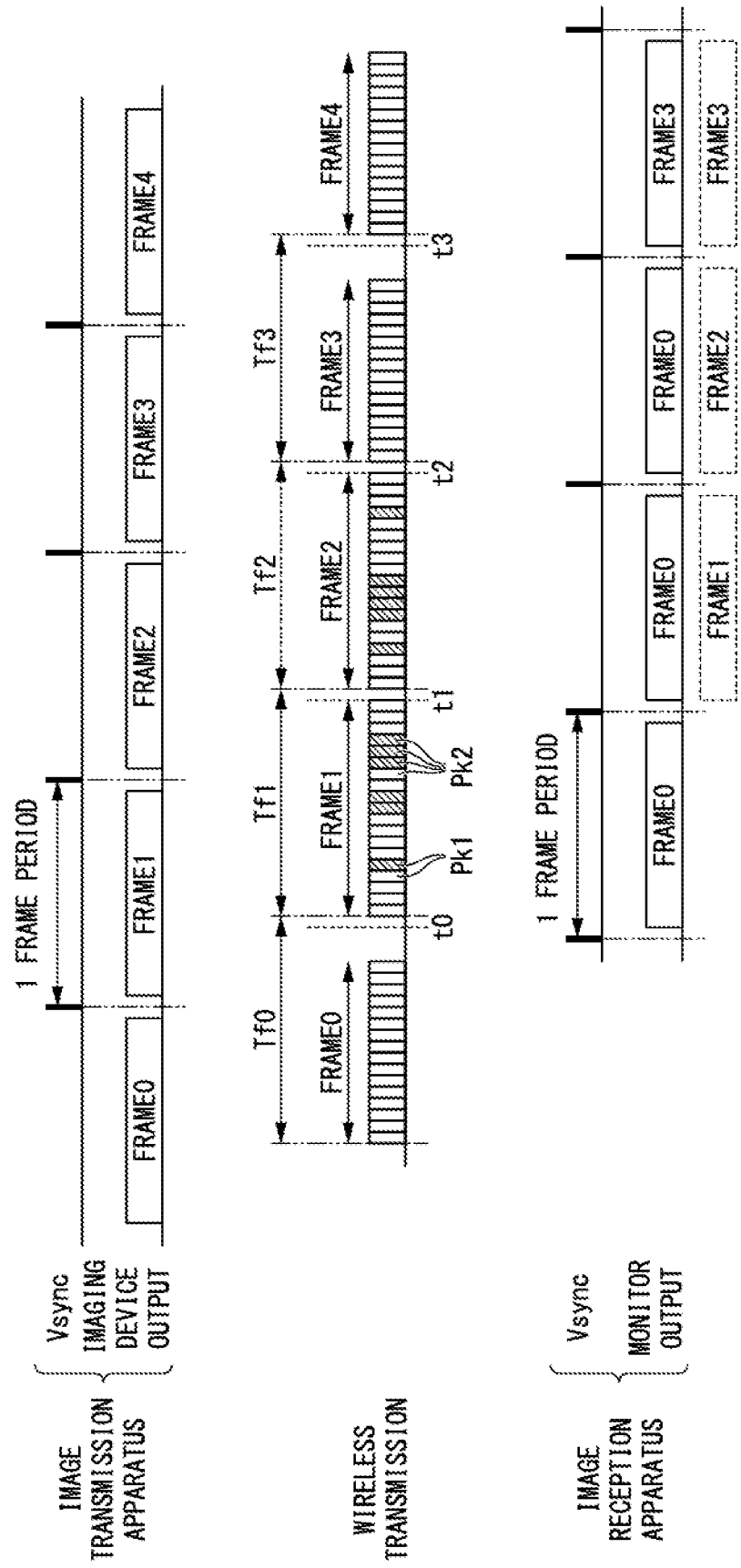
FIG. 22 is a timing chart of image transmission of a related art.

FIG. 21 shows image transmission of the third embodiment. Time progresses to the right in FIG. 21. Differences between the operation shown in FIG. 21 and the operation shown in FIG. 13 will be described.

Transmission of the frame image of frame 1 is not completed at the determination timing t1 of the transmission period Tf1 of frame 1. Accordingly, the transmission mode is set to "second extended transmission" through the process in step S152. The frame image of frame 1 is transmitted through the process in step S154 in the transmission period Tf2 of frame 2. At this time, data of the frame image which has not been transmitted in the transmission period Tf1 of frame 1 is transmitted. After transmission of the frame image of frame 1 is completed in the transmission period Tf2 of frame 2, the frame image of frame 2 is transmitted through the process in step S163.

Transmission of the frame image of frame 2 is not completed at the determination timing t2 of the transmission period Tf2 of frame 2. Accordingly, the transmission mode is set to "first extended transmission" through the process in step S157. The frame image of frame 2 is transmitted through the process in step S132 in the transmission period Tf3 of frame 3. At this time, data of the frame image which has not been transmitted in the transmission period Tf2 of frame 2 is transmitted.

Since the frame image of frame 2 is transmitted in the transmission period Tf3 of frame 3, transmission of the frame image of frame 3 is stopped through the process in step S134. Transmission of the frame image of frame 2 is completed before the determination timing t3 of the transmission period Tf3 of frame 3. The frame image of frame 2 is displayed on the monitor 300 after the frame image of frame 1 is displayed on the monitor 300.

With respect to points other than those described above, the operation shown in FIG. 21 is the same as the operation shown in FIG. 13.

In image transmission shown in FIG. 21, transmission of the frame images of frame 1 and frame 2 is completed. Accordingly, loss of the frame images of the consecutive frames 1 and 2 is avoided.

When transmission of the frame image of frame 1 is not completed in the transmission period Tf1 of frame 1, the frame image of frame 2 is transmitted in the transmission period Tf2 of frame 2 and the transmission period Tf3 of frame 3. That is, the image transmission apparatus 100 of the third embodiment can transmit the frame image of frame 2 using a period longer than the transmission period of one frame. Accordingly, it is easy to avoid loss of the frame image of frame 2.

While preferred embodiments of the invention have been described and shown above, it should be understood that these are exemplars of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An image transmission apparatus, comprising:
an imaging device configured to perform imaging in imaging cycles and output a frame image in each imaging cycle;
wireless communication equipment configured to wirelessly transmit the frame image output from the imaging device in each imaging cycle to an image reception apparatus in a transmission period corresponding to the imaging cycle; and
at least one processor,
wherein the frame image output from the imaging device in a first imaging cycle among the imaging cycles is defined as a first frame image,
the frame image output from the imaging device in a second imaging cycle following the first imaging cycle is defined as a second frame image,
the frame image output from the imaging device in a third imaging cycle following the second imaging cycle is defined as a third frame image,
transmission start times of the frame images are synchronized with start times of the imaging cycles,
the processor is configured to determine whether the wireless communication equipment is able to complete transmission of the first frame image within the transmission period corresponding to the first imaging cycle and control the wireless communication equipment to continue transmission of the first frame image in the transmission period of the second frame image output from the imaging device in the second imaging cycle upon determining that the wireless communication equipment is not able to complete transmission of the first frame image,
the processor is configured to control the wireless communication equipment not to transmit the second frame image, and the processor is configured to determine whether the current time is a transmission start time of the third frame image in the third imaging cycle and start transmission of the third frame image upon determining that the current time is the transmission start time of the third frame image, the image transmission apparatus further comprising an image compression circuit configured to perform an image compression process on the frame images output from the imaging device, wherein the processor is configured to control the image compression circuit not to perform the image compression process for the second frame image when the processor determines that the wireless communication equipment is not able to complete transmission of the first frame image within the transmission period corresponding to the first imaging cycle.

2. An image transmission method, comprising:

a first step in which at least one processor wirelessly transmits frame images output from an imaging device to an image reception apparatus through wireless communication equipment, the frame image output from the imaging device in a first imaging cycle among imaging cycles being defined as a first frame image, the frame image output from the imaging device in a second imaging cycle following the first imaging cycle being defined as a second frame image, the frame image output from the imaging device in a third imaging cycle following the second imaging cycle being defined as a third frame image, transmission start times of the frame images being synchronized with start times of the imaging cycles;

a second step in which the processor determines whether the wireless communication equipment is able to complete transmission of the first frame image within a transmission period corresponding to the first imaging cycle and controls the wireless communication equipment to continue transmission of the first frame image in a transmission period of the second frame image output from the imaging device in the second imaging cycle upon determining that the wireless communication equipment is not able to complete transmission of the first frame image;

a third step in which the processor controls the wireless communication equipment not to transmit the second frame image, a fourth step in which the processor determines whether the current time is a transmission start time of the third frame image in the third imaging cycle and starts transmission of the third frame image upon determining that the current time is the transmission start time of the third frame image, and a fifth step in which an image compression circuit performs an image compression process on the frame images output from the imaging device, wherein the processor controls the image compression circuit not to perform the image compression process for the second frame image when the processor determines that the wireless communication equipment is not able to complete transmission of the first frame image within the transmission period corresponding to the first imaging cycle.

3. A non-transitory computer-readable recording medium recording a program for causing a computer to execute:

a first step in which the computer wirelessly transmits frame images output from an imaging device to an image reception apparatus through wireless communication equipment, the frame image output from the imaging device in a first imaging cycle among imaging cycles being defined as a first frame image, the frame image output from the imaging device in a second imaging cycle following the first imaging cycle being defined as a second frame image, the frame image output from the imaging device in a third imaging cycle following the second imaging cycle being defined as a third frame image, transmission start times of the frame images being synchronized with start times of the imaging cycles;

a second step in which the computer determines whether the wireless communication equipment is able to complete transmission of the first frame image within a transmission period corresponding to the first imaging cycle and controls the wireless communication equipment to continue transmission of the first frame image in a transmission period of the second frame image output from the imaging device in the second imaging cycle upon determining that the wireless communication equipment is not able to complete transmission of the first frame image;

a third step in which the processor controls the wireless communication equipment not to transmit the second frame image, a fourth step in which the computer determines whether the current time is a transmission start time of the third frame image in the third imaging cycle and starts transmission of the third frame image upon determining that the current time is the transmission start time of the third frame image, and a fifth step in which an image compression circuit performs an image compression process on the frame images output from the imaging device, wherein the processor controls the image compression circuit not to perform the image compression process for the second frame image when the processor determines that the wireless communication equipment is not able to complete transmission of the first frame image within the transmission period corresponding to the first imaging cycle.

* * * * *